United States Patent
Iwase

(10) Patent No.: US 10,712,476 B2
(45) Date of Patent: Jul. 14, 2020

(54) GAS BARRIER FILM AND WAVELENGTH CONVERSION FILM

(71) Applicant: FUJIFILM Corporation, Tokyo (JP)

(72) Inventor: Eijiro Iwase, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 123 days.

(21) Appl. No.: 16/106,383

(22) Filed: Aug. 21, 2018

(65) Prior Publication Data

US 2018/0364398 A1  Dec. 20, 2018

Related U.S. Application Data

(63) Continuation of application No. PCT/JP2017/002859, filed on Jan. 27, 2017.

(30) Foreign Application Priority Data

Mar. 10, 2016 (JP) .................. 2016-046870

(51) Int. Cl.
*G02B 1/14* (2015.01)
*C09J 175/14* (2006.01)
(Continued)

(52) U.S. Cl.
CPC .................. *G02B 1/14* (2015.01); *B32B 9/00* (2013.01); *B32B 27/30* (2013.01); *C08F 299/00* (2013.01);
(Continued)

(58) Field of Classification Search
CPC .......... G02B 1/14; G02B 5/0221; G02B 5/02; C09D 175/14; C08L 55/005;
(Continued)

(56) References Cited

U.S. PATENT DOCUMENTS 5,903,391 A   5/1999 Toshima et al.
2009/0135489 A1   5/2009 Ryu et al.
(Continued)

FOREIGN PATENT DOCUMENTS

JP   3373106 B2   2/2003
JP   2009-510515 A   3/2009
(Continued)

OTHER PUBLICATIONS

International Preliminary Report on Patentability and Written Opinion of the International Searching Authority (Forms PCT/IB/326, PCT/IB/373, and PCT/ISA/237) For International Application No. PCT/JP2017/002859, dated Sep. 20, 2018, with English Translation.
(Continued)

*Primary Examiner* — Nathan L Van Sell
(74) *Attorney, Agent, or Firm* — Birch, Stewart, Kolasch & Birch, LLP

(57) ABSTRACT

A gas barrier film has a support, an inorganic layer and an organic layer on one surface of the support, and a light diffusion layer containing a binder and a light diffusion agent on the other surface of the support. The binder has a graft copolymer which has an acryl polymer as a main chain and a urethane polymer or a urethane oligomer having an acryloyl group terminal as a side chain, an acryl polymer which has methacrylate as a side chain, and a graft copolymer which has an acryl polymer as a main chain and a urethane polymer or a urethane oligomer having a polycarbonate group terminal as a side chain.

20 Claims, 1 Drawing Sheet

(51) Int. Cl.
- *B32B 27/30* (2006.01)
- *B32B 9/00* (2006.01)
- *G02B 5/02* (2006.01)
- *C08F 299/00* (2006.01)
- *C08L 55/00* (2006.01)
- *C09D 175/14* (2006.01)
- *C08L 87/00* (2006.01)
- *G02F 1/13357* (2006.01)
- *G02F 1/1335* (2006.01)

(52) U.S. Cl.
CPC ........... *C08L 55/005* (2013.01); *C08L 87/005* (2013.01); *C09D 175/14* (2013.01); *C09J 175/14* (2013.01); *G02B 5/02* (2013.01); *G02B 5/0221* (2013.01); *G02F 1/1336* (2013.01); *C08L 2205/025* (2013.01); *C08L 2205/035* (2013.01); *G02F 1/133504* (2013.01); *G02F 1/133617* (2013.01); *G02F 2001/133614* (2013.01); *G02F 2201/501* (2013.01); *G02F 2202/36* (2013.01)

(58) Field of Classification Search
CPC ......... C08L 2205/035; C08L 2205/025; C08L 83/00; C08L 75/14; C08L 87/005; C08F 299/00; B32B 9/00; B32B 27/30; B32B 2255/28; B32B 2255/26; B32B 2255/10; B32B 2307/40; B32B 2307/7242; C09J 175/14; G02F 1/1336; G02F 1/133617; G02F 1/133504; G02F 2202/36; G02F 2202/501; G02F 2001/133614; C23C 16/545; C23C 16/345; C08J 7/0423
See application file for complete search history.

(56) References Cited

U.S. PATENT DOCUMENTS

| | | | |
|---|---|---|---|
| 2012/0113672 | A1 | 5/2012 | Dubrow et al. |
| 2012/0302676 | A1* | 11/2012 | Oya ........................ C08K 5/29 524/89 |
| 2015/0330602 | A1 | 11/2015 | Yonemoto et al. |

FOREIGN PATENT DOCUMENTS

| | | |
|---|---|---|
| JP | 2010-72282 A | 4/2010 |
| JP | 2010-85501 A | 4/2010 |
| JP | 2011-209657 A | 10/2011 |
| JP | 2012-78420 A | 4/2012 |
| JP | 2012-78736 A | 4/2012 |
| JP | 2013-544018 A | 12/2013 |
| KR | 10-2015-0133134 A | 11/2015 |
| WO | WO 2015/190202 A1 | 12/2015 |

OTHER PUBLICATIONS

International Search Report (form PCT/ISA/210) For International Application No. PCT/JP2017/002859, dated Apr. 18, 2017 with English Translation.

Korean Office Action for corresponding Korean Application No. 10-2018-7025070, dated Jan. 15, 2020, with English translation.

* cited by examiner

GAS BARRIER FILM AND WAVELENGTH CONVERSION FILM

CROSS-REFERENCE TO RELATED APPLICATIONS

This application is a Continuation of PCT International Application No. PCT/JP2017/002859 filed on Jan. 27, 2017, which claims priority under 35 U.S.C § 119(a) to Japanese Patent Application No. 2016-046870 filed on Mar. 10, 2016. Each of the above application(s) is hereby expressly incorporated by reference, in its entirety, into the present application.

BACKGROUND OF THE INVENTION

1. Field of the Invention

The present invention relates to a gas barrier film having excellent ultraviolet resistance and heat resistance and a wavelength conversion film using the gas barrier film.

2. Description of the Related Art

As an image display device that consumes less power and occupies a small space, a liquid crystal display (hereinafter, referred to as LCD as well) is increasingly widely used year after year. Furthermore, in recent years, for LCD, a further reduction in power consumption, the enhancement of color reproducibility, and the like have been required as the improvement of performance.

In LCD, a backlight unit including, as a light source, a white light source such as a white light-emitting diode (LED) is widely used.

In contrast, in recent years, as described in JP2013-544018A and the like, a novel backlight unit has been suggested which realizes white light by light that is emitted not from a white light source but from a light source such as a blue LED and light from a wavelength conversion member that contains phosphors emitting fluorescence by being excited with the light emitted from the light source and is disposed as a member different from the light source.

The use of quantum dots as phosphors in such a wavelength conversion member is being examined.

Generally, the quantum dots are made into a quantum dot layer (wavelength conversion layer) by being dispersed in a binder formed of a resin such as an acrylic resin or an epoxy resin. For example, as a wavelength conversion film performing wavelength conversion, the quantum dot layer is used by being disposed between a backlight and a liquid crystal panel.

In a case where excitation light from the backlight is incident on the quantum dot layer, the quantum dots are excited and emit fluorescence. At this time, in a case where quantum dots having different emission characteristics are used, light having a narrow half-width such as red light, green light, and blue light is emitted, and hence white light can be realized. Because the fluorescence from the quantum dots has a narrow half-width, by appropriately selecting the wavelength, it is possible to obtain white light with high luminance or to prepare a design so as to obtain excellent color reproducibility.

Incidentally, unfortunately, the quantum dots easily deteriorate due to moisture or oxygen, and the emission intensity of the quantum dots deteriorates due to a photo-oxidation reaction. Therefore, in JP2013-544018A, the quantum dot layer is sandwiched between two sheets of gas barrier films so as to protect the quantum dots.

Furthermore, paragraphs <0162> and <0163> in JP2013-544018A also describe that a light scattering layer (layer having scattering particles) is provided in a portion different from the quantum dot layer.

As such a light scattering layer, for example, there is a light diffusion layer described in JP3373106B that is obtained by dispersing particles of titanium oxide, alumina, calcium carbonate, and the like as a light diffusion agent in a binder containing an ionizing radiation-curable resin which is cured by being irradiated with ionizing radiation such as ultraviolet rays.

SUMMARY OF THE INVENTION

The inventors of the present invention predict that in a case where a light scattering layer is provided in addition to a quantum dot layer as described in JP2013-544018A, the amount of excitation light incident on the quantum dot layer or the amount of light emitted from the quantum dot layer will increase, and hence the luminance of LCD could be improved. Based on the prediction, the inventors repeated examinations.

As a result, it was confirmed that in a case where a light scattering layer is provided in a wavelength conversion film having a quantum dot layer, the luminance can be further improved than in a case where the light scattering layer is not provided. In a case where the luminance can be improved in this way, LCD could display clear images with high luminance, a certain level of luminance could be achieved at low costs by reducing the amount of quantum dots used, or the backlight unit could be thinned by thinning the quantum dot layer.

However, quantum dot materials are vulnerable to heat or oxygen.

Therefore, in a case where a quantum dot layer is sandwiched between gas barrier films and then a light diffusion layer is formed on the surface of the gas barrier films, the quantum dot layer is damaged by heat in a drying furnace or an ultraviolet device at the time of forming the light diffusion layer, and the quantum dots deteriorate. This is not preferable because quality deterioration occurs in some cases. Furthermore, the larger the number of layers laminated, the more difficult it is to control curling or handle the film. Therefore, it cannot be said that the productivity is excellent.

That is, in order to prevent quantum dots from deteriorating by heat, it is preferable to manufacture a wavelength conversion film by creating gas barrier films having a light diffusion layer and then sandwiching a quantum dot layer between two sheets of the gas barrier films.

Incidentally, the aforementioned wavelength conversion film manufacturing method has the problem of the deterioration of the light diffusion layer.

The quantum dot layer is constituted with a binder such as an ultraviolet-curable resin and a quantum dot material dispersed in the binder. The quantum dot layer is prepared, for example, by preparing a composition, which is obtained by dispersing a quantum dot material in a solution obtained by dissolving a binder in an organic solvent, applying and drying the composition, and curing the binder by ultraviolet irradiation.

The wavelength conversion film in which a quantum dot layer is sandwiched between gas barrier films as described in JP2013-544018A is prepared by coating a gas barrier film with a composition forming a quantum dot layer, laminating another sheet of gas barrier film on the composition with which the gas barrier film is coated, drying the composition, and performing ultraviolet irradiation.

In a case where the amount of ultraviolet rays radiated for curing the binder is insufficient, the quantum dot layer is likely to undergo aggregation and peeling or to be insufficiently cured.

The quantum dot layer is a relatively thick layer having a thickness of about 100 μm, for example. Therefore, at the time of forming the quantum dot layer, in order to sufficiently cure the binder, an extremely large amount of ultraviolet rays need to be radiated.

As described in JP3373106B as well, in the light diffusion layer, an ultraviolet-curable resin or the like is used as a binder in many cases in consideration of optical characteristics, hardness, and the like.

Accordingly, in the gas barrier film in which the light diffusion layer is formed, due to the large amount of ultraviolet rays used at the time of curing the quantum dot layer or the heat generated by the absorption of ultraviolet rays, the ultraviolet-curable resin, which becomes a binder of the light diffusion layer, is decomposed or undergoes the reduction of the molecular weight. As a result, the transmittance for short-wavelength light having a wavelength equal to or shorter than 500 nm is mainly reduced.

In recent years, for the purpose of improving a light use efficiency, making LCD as a thin film, reducing power consumed by LCD, and the like, a reduction in a distance between a wavelength conversion film and LED as a light source has been required.

In a wavelength conversion film having a light diffusion layer, the light diffusion layer is disposed to face LED as a light source. Accordingly, in a case where the wavelength conversion film and LED as a light source becomes close to each other, the intensity of light incident on the light diffusion layer increases, and hence the temperature of the light diffusion layer further increases.

That is, in recent years, in the wavelength conversion film using gas barrier films having a light diffusion layer, a likelihood that the light transmittance of the light diffusion layer may deteriorate due to the light from a light source and heat even while the wavelength conversion film is being used has been raised.

Therefore, there is a demand for providing a light diffusion layer, which has high transparency and high light scattering properties and exhibits high durability against heat or light, to a gas barrier film.

The present invention is for solving the aforementioned problems of the technique of the related art, and an object thereof is to provide a gas barrier film with a light diffusion layer, which has high transparency and excellent light diffusion properties and exhibits high durability against light or heat, and a wavelength conversion film using the gas barrier film with a light diffusion layer.

In order to achieve the aforementioned object, the inventors of the present invention repeated intensive examinations.

As a result, the inventors found that by establishing a scattering structure formed of a polymer having a low refractive index and diffusion particles having a refractive index lower than that of the polymer so as to accomplish both the high transparency and the high light scattering properties, by adding a methacrylate-containing polymer which is not easily decomposed by light and heat and has a high glass transition temperature so as to improve durability, by adding a high urethane acrylate polymer for improving the adhesiveness with respect to a substrate, and by using silicone particles as diffusion particles, a gas barrier film with a light diffusion layer is obtained which has high transparency and high light scattering properties and exhibits high durability.

That is, a gas barrier film with a light diffusion layer of the present invention comprises a support, a combination of an inorganic layer and an organic layer which is an underlying base of the inorganic layer on a first surface of the support, and a light diffusion layer that is on a second surface of the support opposite to the first surface side and contains a binder in which a light diffusion agent is dispersed, in which the binder of the light diffusion layer contains a first component which is a graft copolymer having an acryl polymer as a main chain and at least one of an acryloyl group-terminated urethane polymer or an acryloyl group-terminated urethane oligomer as a side chain, a second component having an acryl polymer as a main chain and methacrylate as a side chain, and a third component which is a graft copolymer having an acryl polymer as a main chain and at least one of a polycarbonate group-terminated urethane polymer or a polycarbonate group-terminated urethane oligomer as a side chain, and the light diffusion agent is silicone resin particles.

In the gas barrier film with a light diffusion layer of the present invention, it is preferable that the first component has a weight-average molecular weight of 10,000 to 300,000 and a double bond equivalent equal to or greater than 1,000 g/mol.

It is preferable that the second component has a weight-average molecular weight of 20,000 to 40,000.

It is more preferable that the binder contains at least one of a urethane acrylate polymer or a urethane acrylate oligomer.

It is preferable that the binder further contains a urethane acrylate oligomer.

It is preferable that the second component has a glass transition temperature equal to or higher than 100° C.

It is preferable that the third component has a glass transition temperature equal to or higher than 50° C.

It is preferable that in the light diffusion layer, a difference n1−n2 between a refractive index n1 of the binder and a refractive index n2 of the light diffusion agent is 0.04 to 0.1, and the refractive index n1 of the binder is equal to or lower than 1.52.

It is preferable that in the light diffusion layer, a mass of the binder with respect to a mass of the light diffusion agent (mass of binder/mass of light diffusion agent) is 0.3 to 0.65.

It is preferable that the light diffusion agent is two kinds of silicone resin particles having different particle diameters, first silicone resin particles have a particle diameter of 1 to 5 μm, second silicone resin particles have a particle diameter of 6 to 14 μm, and a total mass of the first silicone resin particles with respect to a total mass of the second silicone resin particles (mass of small-diameter particles/mass of large-diameter particles) is 0.6 to 1.4.

It is preferable that the light diffusion layer has a thickness of 10 to 20 μm.

It is preferable that a difference TT1−TT2 between a transmittance TT1 from the light diffusion layer side and a transmittance TT2 from a side opposite to the light diffusion layer side is 10% to 30%, and the transmittance TT1 from the light diffusion layer side is equal to or higher than 88%.

It is preferable that a haze is equal to or higher than 90%.

A wavelength conversion film of the present invention has a wavelength conversion layer and the gas barrier film with a light diffusion layer of the present invention that is laminated on at least one surface of the wavelength conversion layer, and the wavelength conversion layer is provided on the first surface side of the support.

In the wavelength conversion film of the present invention, it is preferable that the wavelength conversion layer is a quantum dot layer.

It is preferable that the gas barrier film with a light diffusion layer is provided on one surface of the wavelength conversion layer, and a gas barrier film is provided on the other surface of the wavelength conversion layer.

It is preferable that the gas barrier film has a support, one or more combinations of an inorganic layer and an organic layer which is an underlying base of the inorganic layer on one surface of the support, and the surface, on which the organic layer and the inorganic layer are formed, faces the wavelength conversion layer side.

The gas barrier film with a light diffusion layer of the present invention has high transparency and excellent light diffusion properties and exhibits high durability against light or heat.

Furthermore, by using the gas barrier film with a light diffusion layer of the present invention, the wavelength conversion film of the present invention can be irradiated with light having high luminance and exhibits high durability.

DESCRIPTION OF THE PREFERRED EMBODIMENTS

Hereinafter, the gas barrier film with a light diffusion layer and the wavelength conversion film of the present invention will be specifically described based on preferred examples shown in the attached drawings.

Figure 1:
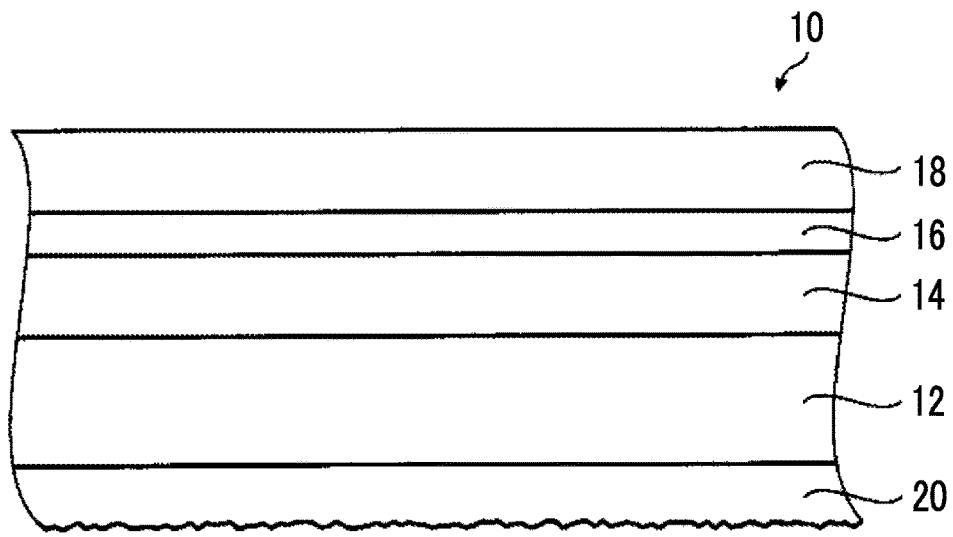
FIG. 1 is a view conceptually showing an example of a gas barrier film with a light diffusion layer of the present invention.

FIG. 1 conceptually shows an example of the gas barrier film with a light diffusion layer of the present invention.

A gas barrier film with a light diffusion layer 10 shown in FIG. 1 basically has a support 12 as well as an organic layer 14 as an underlying base (hereinafter, referred to as base as well), an inorganic layer 16, and an adhesion layer 18 as an outermost surface that are formed on one surface of the support 12. Furthermore, a light diffusion layer 20 is provided on a surface, which is opposite to the surface on which the organic layer 14 as an underlying base or the inorganic layer 16 is formed, of the support 12. The adhesion layer 18 as the outermost surface is provided as a preferred aspect.

In the following description, "gas barrier film with a light diffusion layer 10" will be simply referred to as "barrier film 10" as well.

As described above, the barrier film 10 shown in FIG. 1 has the organic layer 14 as a base, the inorganic layer 16, and the adhesion layer 18 as the outermost surface on one surface (first surface) of the support 12. That is, the barrier film 10 has one combination of the organic layer 14 as a base and the inorganic layer 16.

However, the barrier film of the present invention can adopt various layer constitutions other than the above constitution.

For example, a constitution may be adopted in which the barrier film has two combinations of the organic layer 14 as a base and the inorganic layer 16 and further has the adhesion layer 18 on the outermost surface. Alternatively, a constitution may be adopted in which the barrier film has three or more combinations of the organic layer 14 as a base and the inorganic layer 16 and further has the adhesion layer 18 on the outermost surface.

As another option, a constitution may be adopted in which the inorganic layer 16 is formed on a surface of the support 12, and one or more combinations of the organic layer 14 as a base and the inorganic layer 16 are provided on the inorganic layer 16.

That is, the barrier film of the present invention can adopt various constitutions as long as the barrier film has an organic and inorganic laminated structure having one or more combinations of an inorganic layer and an organic layer which is an underlying base of the inorganic layer.

In the barrier film 10, as the support 12, it is possible to use various known sheet-like materials that are used as a support in various gas barrier films or various laminated functional films.

Specifically, examples suitable as support 12 include films formed of various resin materials (resin films) such as polyethylene (PE), polyethylene naphthalate (PEN), polyamide (PA), polyethylene terephthalate (PET), polyvinyl chloride (PVC), polyvinyl alcohol (PVA), polyacrylonitrile (PAN), polyimide (PI), transparent polyimide, a polymethyl methacrylate resin (PMMA), polycarbonate (PC), polyacrylate, polymethacrylate, polypropylene (PP), polystyrene (PS), ABS, a cycloolefin•copolymer (COC), a cycloolefin polymer (COP), and triacetyl cellulose (TAC).

In the present invention, as the support 12, a material may be used which is prepared by forming layers (films) for obtaining various functions, such as a protective layer, an adhesive layer, a light reflecting layer, an antireflection layer, a light blocking layer, a planarizing layer, a buffer layer, and a stress relaxation layer, on a surface of the aforementioned resin films.

As the support 12, a material having a high ultraviolet transmittance (light transmittance) is preferable.

In the wavelength conversion film of the present invention that will be described later, a quantum dot layer 32 is formed by coating the adhesion layer 18 of the barrier film 10 with a polymerizable composition (curable composition) that becomes the quantum dot layer 32, laminating another barrier film 34, and then curing the polymerizable composition by ultraviolet irradiation. Accordingly, in order to appropriately form the quantum dot layer, it is preferable that the support 12 has a high ultraviolet transmittance.

The thickness of the support 12 may be appropriately set according to the use, the material forming the support, and the like.

According to the examination conducted by the inventors of the present invention, the thickness of the support 12 is preferably 5 to 100 μm, and more preferably 10 to 50 μm.

It is preferable that the thickness of the support 12 is within the above range, because then the mechanical strength of the barrier film 10 is sufficiently secured, and the barrier film 10 is made into a light, thin, and flexible film. In addition, in a case where the thickness of the support 12 is within the above range, the wavelength conversion film of the present invention that will be described later can be thinned.

In the barrier film 10, the organic layer 14 as a base which is a base layer of the inorganic layer 16 is provided on the support 12.

The organic layer 14 as a base is a layer formed of an organic compound and basically prepared by polymerizing (crosslinking) a monomer or an oligomer that becomes the organic layer 14 as a base.

The organic layer 14 as a base functions as a base layer for appropriately forming the inorganic layer 16 which mainly exhibits gas barrier properties in the barrier film 10.

In a case where the barrier film 10 has the organic layer 14 as a base, the surface asperities of the support 12, foreign substances having adhered to the surface of the support 12, and the like are concealed, and hence a deposition surface for the inorganic layer 16 can be in a state suitable for forming the inorganic layer 16. Accordingly, it is possible to form an appropriate inorganic layer 16 without voids on the entire surface of the support, by removing regions, on which an inorganic compound that becomes the inorganic layer 16 is not easily deposited as a film, such as surface asperities or shadows of foreign substances on the support 12.

In the barrier film 10, as the material for forming the organic layer 14 as a base, various known organic compounds can be used without limitation.

Specifically, thermoplastic resins such as polyester, a (meth)acrylic resin, a methacrylic acid-maleic acid copolymer, polystyrene, a transparent fluorine resin, polyimide, fluorinated polyimide, polyamide, polyamide imide, polyether imide, cellulose acylate, polyurethane, polyether ether ketone, polycarbonate, alicyclic polyolefin, polyarylate, polyether sulfone, polysulfone, fluorene ring-modified polycarbonate, alicyclic ring-modified polycarbonate, fluorene ring-modified polyester, and an acryl compound, polysiloxane, and films of other organic silicon compounds can be suitably exemplified. A plurality of these materials may be used in combination.

Among these, in view of excellent glass transition temperature or hardness, an organic layer 14 as a base is suitable which is constituted with a polymer of a radically curable compound and/or a cationically curable compound having an ether group as a functional group.

Particularly, an acrylic resin or a methacrylic resin, which contains a polymer of a monomer or an oligomer of acrylate and/or methacrylate as a main component, can be suitably exemplified as the organic layer 14 as a base, because such a resin has low refractive index, high transparency, excellent optical characteristics, and the like.

Especially, an acrylic resin or a methacrylic resin can be suitably exemplified which contains, as a main component, a polymer of a monomer or an oligomer of acrylate and/or methacrylate having two or more functional groups, particularly, three or more functional groups, such as dipropylene glycol di(meth)acrylate (DPGDA), trimethylolpropane tri(meth)acrylate (TMPTA), or dipentaerythritol hexa(meth)acrylate (DPHA). Furthermore, it is preferable to use a plurality of acrylic resins or methacrylic resins described above.

The thickness of the organic layer 14 as a base may be appropriately set according to the material forming the organic layer 14 as a base or the support 12. According to the examination performed by the inventors of the present invention, the thickness of the organic layer 14 as a base is preferably 0.5 to 5 µm, and more preferably 1 to 3 µm.

In a case where the thickness of the organic layer 14 as a base is equal to or greater than 0.5 µm, the surface of the organic layer 14 as a base, that is, the deposition surface for the inorganic layer 16 can be flattened by concealing the surface asperities of the support 12 or the foreign substances having adhered to the surface of the support 12.

In a case where the thickness of the organic layer 14 as a base is equal to or smaller than 5 µm, it is possible to suitably inhibit the occurrence of problems such as cracking of the organic layer 14 as a base caused in a case where the organic layer 14 as a base is too thick and curling of the barrier film 10.

In a case where the barrier film has a plurality of organic layers 14 as a base as described above, the organic layers 14 as a base may have the same thickness or different thicknesses. Furthermore, the organic layers 14 as a base may be formed of the same material or different materials.

The organic layer 14 as a base may be formed (deposited) by a known method for forming a layer formed of an organic compound, according to the organic layer 14 as a base to be formed.

For example, the organic layer 14 as a base may be formed by a so-called coating method including steps of preparing a coating composition which contains an organic solvent, an organic compound (a monomer, a dimer, a trimer, an oligomer, a polymer, or the like) that becomes the organic layer 14 as a base, a surfactant, a silane coupling agent, and the like, coating the support with the coating composition, drying the coating composition, and, if necessary, polymerizing (crosslinking) the organic compound by ultraviolet irradiation and the like.

Furthermore, it is preferable to form the organic layer 14 as a base by so-called roll-to-roll (hereinafter, referred to as RtoR as well). As it is well known, RtoR is a manufacturing method in which a material on which a film is to be formed is fed from a material roll formed by winding a long material, on which a film is to be formed, in the form of a roll, a film is formed in a state where the material on which a film is to be formed is being transported in a longitudinal direction, and the material on which a film is to be formed that has undergone film formation is wound in the form of a roll. In a case where RtoR is used, high productivity and a high production efficiency are obtained.

The inorganic layer 16 is a layer formed of an inorganic compound.

In the barrier film 10, the inorganic layer 16 is a layer which mainly exhibits the intended gas barrier properties.

The material forming the inorganic layer 16 is not limited, and various layers formed of inorganic compounds exhibiting gas barrier properties can be used.

Specifically, films formed of inorganic compounds including a metal oxide such as aluminum oxide, magnesium oxide, tantalum oxide, zirconium oxide, titanium oxide, and indium tin oxide (ITO); a metal nitride such as aluminum nitride; a metal carbide such as aluminum carbide; an oxide of silicon such as silicon oxide, silicon oxynitride, silicon oxycarbide, and silicon oxynitrocarbide; a nitride of silicon such as silicon nitride and silicon nitrocarbide; a carbide of silicon such as silicon carbide; hydroxides of these; a mixture of two or more kinds of these; and hydrogenous substances of these can be suitably exemplified. Furthermore, a mixture of two or more kinds of these can also be used.

Particularly, silicon nitride, silicon oxide, silicon oxynitride, aluminum oxide, and a mixture of two or more kinds of these are suitably used because these materials have high transparency and can exhibit excellent gas barrier properties. Among these, silicon nitride is particularly suitably used because this material exhibits excellent gas barrier properties and has high transparency.

The film thickness of the inorganic layer 16 may be appropriately set according to the material forming the inorganic layer such that the inorganic layer can exhibit the intended gas barrier properties. According to the examination conducted by the inventors of the present invention, the thickness of the inorganic layer 16 is preferably 10 to 200 nm, more preferably 15 to 100 nm, and particularly preferably 20 to 75 nm.

In a case where the thickness of the inorganic layer 16 is equal to or greater than 10 nm, an inorganic layer 16 stably demonstrating a sufficient gas barrier performance can be formed. Generally, in a case where the inorganic layer 16 is brittle and too thick, the inorganic layer 16 is likely to experience cracking, fissuring, peeling and the like. However, in a case where the thickness of the inorganic layer 16 is equal to or smaller than 200 nm, the occurrence of cracks can be prevented.

As described above, in a case where the barrier film has a plurality of inorganic layers 16, the inorganic layers 16 may have the same thickness or different thicknesses. In addition, the inorganic layers 16 may be formed of the same material or different materials.

In the barrier film 10, the method for forming the inorganic layer 16 is not limited. According to the inorganic layer 16 to be formed, various known inorganic layer (inorganic film) forming methods can be used.

Specifically, the inorganic layer 16 may be formed by plasma CVD such as CCP-CVD or ICP-CVD, sputtering such as magnetron sputtering or reactive sputtering, and a vapor-phase deposition method such as vacuum vapor deposition.

Furthermore, it is preferable that the inorganic layer 16 is formed by RtoR.

In a preferred aspect, the barrier film 10 has the adhesion layer 18 as an outermost surface on the inorganic layer 16.

The adhesion layer 18 is formed for protecting the inorganic layer 16 and for obtaining high adhesiveness with respect to a wavelength conversion layer such as a quantum dot layer prepared by dispersing functional particles and the like in a binder formed of an organic compound.

As described above, it is known that a quantum dot layer is sandwiched between gas barrier films so as to protect quantum dots vulnerable to oxygen or the like.

In order to secure sufficient gas barrier properties, it is necessary to use an inorganic layer formed of silicon nitride or silicon oxide for the gas barrier film. In contrast, the quantum dot layer is constituted with an acrylic resin or the like in which quantum dots are dispersed. Therefore, in the laminate obtained by sandwiching the quantum dot layer between the gas barrier films, the adhesiveness between the gas barrier film and the quantum dot layer is insufficient in some cases. In a case where the adhesiveness between the gas barrier film and the quantum dot layer is insufficient, delamination occurs in the interface between the gas barrier film and the quantum dot layer. As a result, oxygen or the like is likely to permeate the quantum dot layer from the delamination site, and the quantum dot layer is likely to deteriorate.

In contrast, in a preferred aspect, the barrier film 10 has the adhesion layer 18 on the inorganic layer 16. The adhesion layer 18 is an organic layer formed of an organic compound.

More preferably, the adhesion layer 18 is formed using at least one of an ultraviolet-curable urethane polymer (hereinafter, referred to as a UV-curable urethane polymer as well) which has a urethane polymer as a main chain, a (meth)acryloyl group-terminated side chain, a weight-average molecular weight of 5,000 to 30,000, and a double bond equivalent equal to or greater than 300 g/mol, a curable urethane polyester, a phosphoric acid compound having two or less (meth)acryloyl groups, and a silane coupling agent which contains one (meth)acryloyl group.

The adhesion layer 18 is formed using a polymerizable composition containing these compounds by means of curing and preferably thermally curing the main chain of the UV-curable urethane polymer (urethane polymer main chain) and the curable urethane polyester.

The adhesion layer 18 using the UV-curable urethane polymer has a constitution in which either or both of the phosphoric acid compound and the silane coupling agent containing an uncrosslinked (meth)acryloyl group are dispersed in a matrix (network structure/network) formed of the main chain of the UV-curable urethane polymer and the curable urethane polyester, the main chains of the UV-curable urethane polymer, and the curable urethane polyester molecules that are crosslinked.

Furthermore, it is preferable that the terminal (meth)acryloyl group of the side chain of the UV-curable urethane polymer remains uncrosslinked.

In this case, the surface of the adhesion layer 18 is in a cured state. Accordingly, the barrier film 10 having such an adhesion layer 18 can be wound up. Therefore, the barrier film 10 can also be suitably used in RtoR.

Furthermore, because the barrier film has the adhesion layer 18 whose surface is in a cured state, the adhesion layer 18 functions as a protective layer, and accordingly, the damage of the inorganic layer 16 can also be prevented.

The surface of the inorganic layer 16 such as a silicon nitride layer formed by a vapor-phase deposition method such as plasma CVD is oxidized due to the contact with air, and hence a —OH group or the like is introduced into the inorganic layer 16. Meanwhile, at the time of curing the main chain of the UV-curable urethane polymer and the curable urethane polyester, the hydrolysis reaction of the silane coupling agent proceeds. Furthermore, the phosphoric acid compound has a —OH group. Consequently, the inorganic layer 16 directly forms a covalent bond or a hydrogen bond with the phosphoric acid compound or the silane coupling agent contained in the adhesion layer 18. As a result, the adhesiveness between the inorganic layer 16 and the adhesion layer 18 can also be secured.

The phosphoric acid compound has two or less uncrosslinked (meth)acryloyl groups, and the silane coupling agent has one uncrosslinked (meth)acryloyl group. In addition, the terminal (meth)acryloyl group of the side chain of the UV-curable urethane polymer remains uncrosslinked.

Therefore, as in a light diffusion layer 20 which will be described later, at the time of forming a wavelength conversion layer such as a quantum dot layer on the adhesion layer 18 of the barrier film 10, by ultraviolet irradiation or the like for curing the wavelength conversion layer, an uncrosslinked group of the binder of the wavelength conversion layer, the (meth)acryloyl group of the phosphoric acid compound and/or the silane coupling agent, and the terminal (meth)acryloyl group of the side chain of the UV-curable urethane polymer react with each other and are bonded to each other. Accordingly, the adhesiveness between the wavelength conversion layer and the adhesion layer 18 can also be secured. Furthermore, because the (meth)acryloyl group of the adhesion layer 18 is uncrosslinked, the compound that becomes a binder at the time of forming the wavelength conversion layer easily permeates the adhesion layer 18, and hence a crosslinked structure reaching the inside of the adhesion layer 18 from the inside of the wavelength conversion layer can be formed. This is also a factor that can improve the adhesiveness between the wavelength conversion layer and the adhesion layer 18.

Furthermore, crosslinking also proceeds on the inside of the adhesion layer 18, aggregation and peeling of the adhesion layer 18 and the like can be prevented.

Moreover, preferably, by forming the wavelength conversion layer such as a quantum dot layer simply by ultraviolet irradiation, the adhesiveness between the adhesion layer 18 and the wavelength conversion layer can be secured. Accordingly, as in a case where the adhesiveness is secured using a silane coupling agent, the deterioration of functional particles such as quantum dots resulting from heating can also be prevented.

The UV-curable urethane polymer forming the adhesion layer 18 is a material which has a urethane polymer as a main chain, a (meth)acryloyl group-terminated side chain, a weight-average molecular weight of 5,000 to 30,000, and a double bond equivalent equal to or greater than 300 g/mol and can be cured by ultraviolet rays.

Basically, the main chain of the UV-curable urethane polymer is a known urethane polymer. Accordingly, the main chain may be a polymer formed by the homopolymerization of each of a carbamic acid ester, a urethane oligomer unit, a urethane polymer unit, and the like, a copolymer of any of these, or a copolymer of any of these with another monomer, oligomer, or polymer. The carbamic acid ester, the urethane oligomer unit, and the urethane polymer unit may be the same as or different from each other.

The side chain bonded to the main chain of the UV-curable urethane polymer (urethane polymer main chain) has a (meth)acryloyl group on a terminal thereof. As the side chain, various groups can be used as long as they have a (meth)acryloyl group on a terminal thereof.

Examples of the side chain include a linear or branched alkyl group having a (meth)acryloyl group on a terminal thereof, and the like. As the linear or branched alkyl group, a linear alkyl group having 1 to 6 carbon atoms is preferable. As the alkyl group, for example, a n-propyl group, an ethyl group, and a methyl group are more preferable, and a methyl group is particularly preferable. The side chains having a (meth)acryloyl group on a terminal thereof may be the same as each other or include different side chains.

The UV-curable urethane polymer may have a side chain that does not have a (meth)acryloyl group on a terminal thereof.

Examples of the side chain that does not have a (meth)acryloyl group on a terminal thereof include a linear or branched alkyl group, an ethylene oxide group, a polyethylene oxide group, a propylene oxide group, a polypropylene oxide group, and the like.

The side chains that do not have a (meth)acryloyl group on a terminal thereof may be the same as each other or include different side chains.

As described above, the weight-average molecular weight of the UV-curable urethane polymer forming the adhesion layer 18 is 5,000 to 30,000.

It is preferable that the weight-average molecular weight of the UV-curable urethane polymer is equal to or greater than 5,000, because then the cissing of a film of a coating composition for forming the adhesion layer 18 can be prevented, and an adhesion layer 18 having a desired thickness can be obtained by preventing evaporation caused by heating at the time of forming the adhesion layer 18.

It is preferable that the weight-average molecular weight of the UV-curable urethane polymer is equal to or smaller than 30,000, because then the aggregation and peeling occurring in the adhesion layer 18 can be prevented by the formation of a strong film.

Considering the above points, the weight-average molecular weight of the UV-curable urethane polymer is preferably 10,000 to 27,000.

In the present invention, the weight-average molecular weight (Mw) of various polymers (a resin and a polymer material) may be measured as a molecular weight expressed in terms of polystyrene (PS) by gel permeation chromatography (GPC). More specifically, the weight-average molecular weight may be determined using HLC-8220 (manufactured by Tosoh Corporation), TSKgel Super AWM-H (manufactured by Tosoh Corporation, 6.0 mmID×15.0 cm) as a column, and a 10 mmol/L lithium bromide N-methylpyrrolidone (NMP) solution as an eluent.

As the weight-average molecular weight of a polymer and the like, a numerical value described in a catalog and the like may be used.

The double bond equivalent (acryl equivalent) of the UV-curable urethane polymer forming the adhesion layer 18 is equal to or greater than 300 g/mol. The double bond equivalent is a weight-average molecular weight (mass of a polymer) per 1 mol of polymerizable double bonds (that is, (meth)acryloyl groups) contained in the UV-curable urethane polymer.

In a case where the double bond equivalent of the UV-curable urethane polymer is equal to or greater than 300 g/mol, the amount of the double bonds, that is, the amount of the terminal (meth)acryloyl groups contained in the side chain becomes appropriate, and accordingly, it is possible to prevent the occurrence of curling, interfacial peeling, and the like resulting from a high internal stress caused in a case where the crosslinking density is too high.

Considering the above points, the double bond equivalent of the UV-curable urethane polymer is preferably equal to or greater than 320 g/mol.

The upper limit of the double bond equivalent of the UV-curable urethane polymer is not particularly limited. However, in a case where the double bond equivalent is too large, that is, in a case where the amount of the terminal (meth)acryloyl groups contained in the side chain is too small, problems such as the occurrence of aggregation and peeling caused in the layer due to the insufficient crosslinking in the adhesion layer 18, the deterioration of the protective function of the inorganic layer 16 resulting from the decrease in hardness of the adhesion layer 18, and the ease of occurrence of defects such as scratches are likely to occur.

Considering the above points, the double bond equivalent of the UV-curable urethane polymer is preferably equal to or smaller than 1,500 g/mol, and more preferably equal to or smaller than 1,200 g/mol.

The double bond equivalent of the UV-curable urethane polymer may be measured by a known method. Furthermore, as the double bond equivalent of the UV-curable urethane polymer, the numerical value described in a catalog and the like may be used.

The same is true for a graft copolymer that becomes a binder of the light diffusion layer 20 which will be described later.

As the UV-curable urethane polymer, for example, commercial products such as UV-curable urethane polymers (ACRIT 8UH series) manufactured by TAISEI FINE CHEMICAL CO., LTD. may also be used.

Furthermore, a plurality of kinds of UV-curable urethane polymers may be used in combination.

In the polymerizable composition for forming the adhesion layer 18, the content of the UV-curable urethane polymer may be appropriately set according to the UV-curable urethane polymer to be used.

According to the examination conducted by the inventors of the present invention, the content of the UV-curable urethane polymer in the solid contents of the polymerizable composition (balance remaining after the volatilization of volatile components) is preferably 35% to 55% by mass, and more preferably 40% to 50% by mass.

It is preferable that the content of the UV-curable urethane polymer is equal to or greater than 35% by mass, because then the aggregation and peeling do not easily occur even though the composition contains a non-polymerized (meth) acryloyl group.

It is preferable that the content of the UV-curable urethane polymer is equal to or smaller than 55% by mass, because then the composition can retain a sufficient amount of the phosphoric acid compound or the silane coupling agent that are non-polymerized, a sufficient amount of a thermal crosslinking material can also be added, and surface TAC can be inhibited at the time of thermal curing.

The polymerizable composition for forming the adhesion layer 18 contains a curable urethane polyester (polyester urethane).

As the curable urethane polyester (hereinafter, referred to as a urethane polyester as well), various known urethane polyesters can be used as long as they can be thermally cured.

Therefore, the weight-average molecular weight of the urethane polyester is not particularly limited, and may be appropriately set according to the type of the polyurethane described above and the like.

According to the examination conducted by the inventors of the present invention, the weight-average molecular weight of the urethane polyester is preferably 10,000 to 500,000, and more preferably 20,000 to 100,000.

It is preferable that the weight-average molecular weight of the urethane polyester is equal to or greater than 10,000, because then the evaporation of the urethane polyester caused by heating in a drying step can be inhibited, and a failure such as cissing can be inhibited by appropriately controlling the viscosity of a coating film of a coating composition.

It is preferable that the weight-average molecular weight of the urethane polyester is equal to or smaller than 500,000, because then the amount of a diluent can be reduced at the time of controlling the viscosity of a coating composition, the coating amount can be reduced, and the pot life of the coating composition can be increased.

As the urethane polyester, various commercial products can be used.

Specifically, examples thereof include a VYLON UR series such as VYLON UR1400 manufactured by Toyobo Co., Ltd., and the like.

Furthermore, a plurality of kinds of urethane polyesters may be used in combination.

In the polymerizable composition for forming the adhesion layer 18, the content of the urethane polyester may be appropriately set according to the UV-curable urethane polymer, the urethane polyester, and the like to be used.

According to the examination conducted by the inventors of the present invention, the content of the urethane polyester in the solid contents of the polymerizable composition is preferably 10% to 20% by mass, and more preferably 12% to 17% by mass.

It is preferable that the content of the urethane polyester is equal to or greater than 10% by mass, because then the adhesion layer 18 can be sufficiently cured, and the mechanical strength of the adhesion layer 18 can be secured.

It is preferable that the content of the urethane polyester is equal to or smaller than 20% by mass, because then the adhesiveness between the adhesion layer 18, a wavelength conversion layer such as a quantum dot layer, and the inorganic layer 16 can be improved.

The polymerizable composition for forming the adhesion layer 18 further contains a phosphoric acid compound containing two or less (meth)acryloyl groups and/or a silane coupling agent containing one (meth)acryloyl group.

As the phosphoric acid compound containing two or less (meth)acryloyl groups (hereinafter, referred to as a phosphoric acid compound as well), various known compounds can be used. Specifically, examples thereof include bis[2-(methacryloyloxy)ethyl] and the following compound.

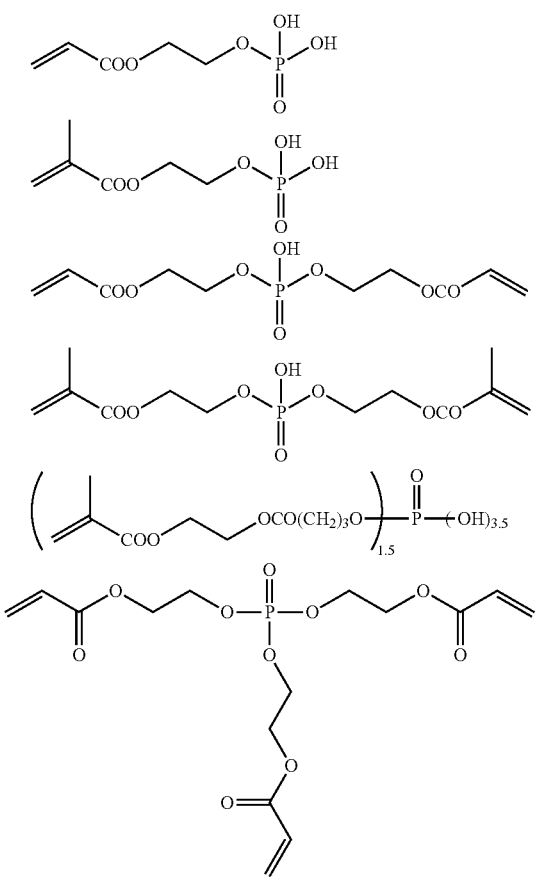

Furthermore, as the phosphoric acid compound, commercial compounds such as a KAYAMER series manufactured by Nippon Kayaku Co., Ltd. and a Phosmer series manufactured by Uni-Chemical Co., Ltd. may be used.

Likewise, as the silane coupling agent containing one (meth)acryloyl group (hereinafter, referred to as a silane coupling agent as well), various known compounds can be used. Specifically, examples thereof include 3-acryloxypropyltrimethoxysilane and the like. As the silane coupling agent, commercial products such as KBM-5103, KBM-502, KBM-503, KBE-502, and KBE-503 manufactured by Shin-Etsu Silicone can also be used. A plurality of kinds of silane coupling agents may be used in combination.

As the phosphoric acid compound, those having a molecular weight of 200 to 400 are preferably used. Silane coupling agents having a molecular weight of 200 to 300 are preferably used.

It is preferable that the molecular weight of the phosphoric acid compound and the silane coupling agent is within the above range, because then the phosphoric acid compound and/or the silane coupling agent can be suitably dispersed in a matrix formed of the UV-curable polyurethane and the urethane polyester described above.

In the polymerizable composition for forming the adhesion layer 18, the content of the phosphoric acid compound and/or the silane coupling agent may be appropriately set according to the UV-curable urethane polymer, the urethane polyester, and the like to be used.

According to the examination conducted by the inventors of the present invention, the content of the phosphoric acid compound and/or the silane coupling agent in the solid contents of the polymerizable composition is preferably 5% to 40% by mass, and more preferably 10% to 35% by mass.

It is preferable that the content of the phosphoric acid compound and/or the silane coupling agent is equal to or greater than 5% by mass, because then the adhesiveness between a wavelength conversion layer such as a quantum dot layer and the inorganic layer 16 can be improved.

It is preferable that the content of the phosphoric acid compound and/or the silane coupling agent is equal to or smaller than 40% by mass, because then the adhesion layer 18 can be sufficiently cured, and blocking caused by bleed-out with the rear surface of the support 12 at the time of winding in RtoR and the like can be prevented.

In the adhesion layer 18, either the phosphoric acid compound or the silane coupling agent may be used, or both the phosphoric acid compound and the silane coupling agent may be used.

For example, in a case where the inorganic layer 16 is silicon nitride, by using only the silane coupling agent, the adhesiveness between the inorganic layer 16 and the adhesion layer 18 can be improved. In a case where the inorganic layer 16 is aluminum oxide, by using only the phosphoric acid compound, the adhesiveness between the inorganic layer 16 and the adhesion layer 18 can be improved. Accordingly, which one will be used between the phosphoric acid compound and the silane coupling agent may be determined according to the material forming the inorganic layer 16 as an underlayer.

In the barrier film 10 of the present invention, for example, a wavelength conversion layer such as a quantum dot layer is sandwiched between two sheets of gas barrier films so as to use the barrier film for preventing the wavelength conversion layer from deteriorating due to oxygen or the like. At this time, in the barrier film 10, the adhesion layer 18 is disposed to face the quantum dot layer and the like. Furthermore, for example, the wavelength conversion layer is constituted with a binder in which functional materials such as quantum dots are dispersed.

Depending on the binder of the wavelength conversion layer sandwiched, higher adhesiveness is obtained in a case where the adhesion layer 18 contains the phosphoric acid compound or in a case where the adhesion layer 18 contains the silane coupling agent. Accordingly, it is preferable that the adhesion layer 18 contains both the phosphoric acid compound and the silane coupling agent, because then excellent adhesiveness can be obtained according to the wavelength conversion layer using various binders.

It is preferable that the adhesion layer 18 contains a photopolymerization initiator.

As will be described later, it is preferable that the wavelength conversion film of the present invention is formed by preparing the barrier film 10 and one sheet of gas barrier film, coating the adhesion layer 18 of the barrier film 10 with a polymerizable composition containing quantum dots for example, then laminating another gas barrier film by causing the gas barrier film to face the polymerizable composition, and drying and curing the polymerizable composition by ultraviolet irradiation. It is considered that, in many cases, the barrier film 10 of the present invention is used in a functional laminated film prepared in the same manner, in addition to the wavelength conversion film.

At the time of curing performed by ultraviolet irradiation, the UV-curable urethane polymer, the phosphoric acid compound, and the silane coupling agent having (meth)acryloyl groups that are contained in the adhesion layer 18 are also crosslinked. At this time, in a case where the adhesion layer 18 contains a photopolymerization initiator, crosslinking more suitably proceeds in the adhesion layer 18. As a result, the adhesiveness between the wavelength conversion layer, the inorganic layer 16, and the adhesion layer 18 can be improved. Furthermore, it is possible to reduce the amount of radiated ultraviolet rays at the time of forming the wavelength conversion layer such as a quantum dot layer.

As the photopolymerization initiator, various known photopolymerization initiators can be used. Specifically, examples suitable as the photopolymerization initiator include commercial products such as an Irgacure series (for example, Irgacure 651, Irgacure 754, Irgacure 184, Irgacure 2959, Irgacure 907, Irgacure 369, Irgacure 379, Irgacure 819, and the like), a Darocure series (for example, Darocure TPO, Darocure 1173, and the like), and Quantacure PDO marketed by BASF SE and an Esacure series (for example, Esacure TZM, Esacure TZT, Esacure KT046, and the like) marketed by Lamberti S.p.A.

The amount of the photopolymerization initiator added may be appropriately set according to the photopolymerization initiator to be used and the like. The amount of the photopolymerization initiator added in the solid contents of the polymerizable composition is preferably 0.5% to 4% by mass, and more preferably 1% to 3% by mass.

It is preferable that the adhesion layer 18 contains a lubricant.

As described above, the barrier film 10 of the present invention can be suitably used for the manufacturing performed by RtoR or the manufacturing of a functional laminated film such as a wavelength conversion film by RtoR.

Because the adhesion layer 18 is formed by a coating method, the surface smoothness thereof is extremely high, although the details will be described later. Therefore, depending on the material forming the adhesion layer 18, films too tightly adhere to each other at the time of winding, and accordingly, sometimes winding-off cannot be smoothly performed.

In contrast, in a case where the adhesion layer 18 contains a lubricant, winding and winding-off can be stably and smoothly performed according to RtoR.

As the lubricant, various known lubricants (matting agents) such as oleic acid amide and silicon oxide particles can be used. Among these, silicon particles, particularly, silicon particles having a particle diameter of about 5 to 30 nm are suitably used. These silicon particles are preferable because they make it possible to obtain an extremely strong lubricating effect even being added in a small amount.

The amount of the lubricant added may be appropriately set according to the lubricant to be used. For example, in a case where silicon particles having a particle diameter of about 5 to 30 nm are used, according to the intended thickness of the adhesion layer, the amount of the silicon particles may be set to be about 0.0005 to 0.005 g/m² and preferably set to be about 0.001 g/m².

The components such as the UV-curable urethane polymer, the curable urethane polyester, the phosphoric acid compound, and the silane coupling agent that become the materials forming the adhesion layer 18 can be detected by analyzing the adhesion layer 18 and interpreting the analysis result by a known method.

The same is true for the light diffusion layer 20 which will be described later.

The thickness of the adhesion layer 18 may be appropriately set according to the material forming the adhesion layer 18, the thickness or the size of the barrier film 10, the use of the gas barrier film, and the like.

According to the examination conducted by the inventors of the present invention, the thickness of the adhesion layer 18 is preferably 10 to 1,000 nm, more preferably 50 to 700 nm, and particularly preferably 70 to 500 nm.

It is preferable that the thickness of the adhesion layer 18 is equal to or greater than 10 nm, because then the inorganic layer 16 can be suitably protected.

It is preferable that the thickness of the adhesion layer 18 is equal to or smaller than 1,000 nm, because then the barrier film 10 can be prevented from becoming unnecessarily thick, the internal stress can be kept at a low level, and high adhesiveness can be realized.

The adhesion layer 18 may be formed by a known method for forming a layer formed of an organic compound, according to the material forming the adhesion layer 18 and the like.

For example, the adhesion layer 18 may be formed by a coating method. That is, first, a coating composition (polymerizable composition) is prepared which contains an organic solvent, the UV-curable urethane polymer, the urethane polyester, and the phosphoric acid compound and/or the silane coupling agent described above or further contains a photopolymerization initiator and/or a lubricant in addition to the above components. If necessary, a thermal polymerization initiator and the like may be added to the coating composition.

Then, the surface of the inorganic layer 16 is coated with the coating composition, and the coating composition is dried by heating. Coating and heating may be performed by a known method.

At the time of heating and drying of the coating composition, the main chain of the UV-curable urethane polymer and the urethane polyester are crosslinked and cured. As a result, as described above, either or both of the phosphoric acid compound and the silane coupling agent containing uncrosslinked (meth)acryloyl groups are dispersed in a matrix formed of the main chain of the UV-curable urethane polymer and the urethane polyester, the UV-curable urethane polymers, and the urethane polyester molecules, and hence a sufficiently cured adhesion layer 18 is formed. In addition, by the heating described above, a hydrogen bond or a covalent bond is formed between the phosphoric acid compound and/or the silane coupling agent (including hydrolysis) and a —OH group on the surface of the inorganic layer 16, and accordingly, the inorganic layer 16 and the adhesion layer 18 adhere to each other with strong adhesion.

The drying temperature of the coating composition (polymerizable composition) forming the adhesion layer 18 may be appropriately set according to the components of the coating composition and the like.

According to the examination conducted by the inventors of the present invention, the drying temperature is preferably 90° C. to 150° C. It is preferable that the drying temperature of the coating composition is within the above range, because then the main chain of the UV-curable urethane polymer and the urethane polyester can be sufficiently cured, the deterioration of the components contained in the coating composition can be prevented, and the deterioration of the support 12 can be prevented.

If necessary, after the drying of the coating composition, a heating step for sufficiently curing the main chain of the UV-curable urethane polymer and the urethane polyester may be performed. The heating temperature of the heating step may be set similarly to the heating temperature during the drying of the coating composition.

It is preferable that the adhesion layer 18 is formed by RtoR.

The adhesion layer 18 is not limited to the aforementioned constitution in which the adhesion layer 18 is formed using the UV-curable urethane polymer and the like. As the adhesion layer 18, organic layers using various organic compounds can be used, as long as the organic layers have hardness that can protect the inorganic layer 16, and sufficient adhesiveness between the wavelength conversion layer such as a quantum dot layer and the organic layers can be secured.

In the barrier film 10, on the second surface, which is opposite to the first surface side (surface side on which the organic layer 14 as a base, the inorganic layer 16, and the adhesion layer 18 are formed), of the support 12, the light diffusion layer 20 is formed. In a case where the barrier film has the light diffusion layer 20, in a quantum dot film, which will be described later, and the like, the amount of excitation light incident on the quantum dot layer or the amount of light emitted from the quantum dot layer can be increased, and hence the luminance of LCD and the like can be improved.

In the barrier film 10 of the present invention, the light diffusion layer may be constituted with a plurality of layers.

However, considering the thickness or the light-transmitting properties of the light diffusion layer, it is preferable that the light diffusion layer is constituted with one layer as illustrated in the drawing.

The light diffusion layer 20 contains a binder in which silicone resin particles are dispersed as a light diffusion agent. The binder contains a first component which is a graft copolymer having an acryl polymer as a main chain and at least one of an acryloyl group-terminated urethane polymer or an acryloyl group-terminated urethane oligomer as a side chain, a second component having an acryl polymer as a main chain and methacrylate as a side chain, and a third component which is a graft copolymer having an acryl polymer as a main chain and at least one of a polycarbonate group-terminated urethane polymer or a polycarbonate group-terminated urethane oligomer as a side chain.

That is, the light diffusion layer 20 is obtained by curing a polymerizable composition containing the first component, the second component, the third component, and silicone resin particles.

In the barrier film 10 of the present invention, the light diffusion layer 20 is formed of the binder constituted with the three components and contains silicone resin particles as a light diffusion agent. Accordingly, the barrier film 10 becomes a barrier film which has excellent light diffusion properties and exhibits excellent durability against heat or light.

As described above, in a wavelength conversion film using a quantum dot layer, in order to prevent the deterioration of quantum dots resulting from oxygen or the like, the quantum dot layer (wavelength conversion layer) is sandwiched between gas barrier films. In addition, by providing a light scattering layer to the wavelength conversion film having the quantum dot layer, the luminance can be further improved compared to a wavelength conversion film that does not have a light scattering layer.

The quantum dots are vulnerable to heat. Therefore, in a case where the light diffusion layer is formed after the quantum dot layer is formed, due to the heat at the time of forming the light diffusion layer, the quantum dots deteriorate. In contrast, by forming a wavelength conversion film having a constitution in which the light diffusion layer is formed on the gas barrier films and then the quantum dot layer is sandwiched between the gas barrier films, it is possible to prevent the deterioration of the quantum dots resulting from heat or the like at the time of forming the quantum dot layer.

Incidentally, in view of optical characteristics, hardness, and the like, an ultraviolet-curable resin is used in the light diffusion layer in many cases. Therefore, with the method of forming the light diffusion layer on the gas barrier layer and then forming the quantum dot layer, due to the ultraviolet irradiation at the time of forming the quantum dot layer, the ultraviolet-curable resin that becomes a binder of the light diffusion layer is decomposed or undergoes the reduction in molecular weight, and the transmittance for short-wavelength light having a wavelength of equal to or shorter than 500 nm is mainly reduced as described above.

In the following description, the reduction of the transmittance for short-wavelength light will be described as "yellowing" of the wavelength conversion layer as well.

In recent years, for the purpose of improving a light use efficiency, making LCD as a thin film, reducing power consumed by LCD, and the like, a reduction in a distance between a wavelength conversion film and LED as a light source has been required.

Incidentally, in a case where the wavelength conversion film and LED as a light source become close to each other, the intensity of light incident on the light diffusion layer increases, and a large amount of heat is generated as a result of light absorption. As a result, in recent years, in the wavelength conversion film in which a quantum dot layer is protected with a gas barrier film having a light diffusion layer, as described above, a likelihood that the yellowing of the light diffusion layer or the like may proceed due to light from a light source or heat and hence the light diffusion layer may deteriorate even in a state where the wavelength conversion film is being used has been raised.

Furthermore, according to the examination conducted by the inventors of the present invention, in a case where the wavelength conversion film and the light source are close to each other, the following problems also occur.

As it is well known, in a wavelength conversion film having a quantum dot layer, generally, a blue LED is used as a light source. Furthermore, as described above, in many cases, a light diffusion layer is constituted with, as a binder, an ultraviolet-curable resin in which a light diffusion agent is dispersed.

In a case where the wavelength conversion film and LED are disposed in positions close to each other, it goes without saying that light of high intensity is incident on the wavelength conversion layer. In a case where the light of high intensity is incident on the wavelength conversion layer, due to short-wavelength components such as blue light or heat generated by light absorption, the decomposition of the binder of the light diffusion layer proceeds, and yellowing of the light diffusion layer and the like proceeds.

In addition, in a case where blue light of high intensity is incident on the light diffusion layer, due to light and heat, a non-polymerized portion of the binder is polymerized, or the binder decomposed by light is repolymerized. In a case where polymerization proceeds on the inside of the light diffusion layer, the internal stress increases, and hence peeling occurs in the interface between the weakest light diffusion layer and the support.

In a case where peeling occurs in the interface between the light diffusion layer and the support, substantially a state where a layer of low refractive index is formed between the light diffusion layer and the support is created. Accordingly, the peeling portion becomes in a state of turning white, and the transmittance (light transmittance) of the light diffusion layer is significantly reduced in this portion.

Furthermore, the peeling occurring in the interface between the light diffusion layer and the support gradually proceeds in the region on which the blue light of high intensity is incident. Therefore, finally, the light diffusion layer peeled from the support is detached. In a case where the light diffusion layer is detached, light is not diffused in that portion. As a result, the luminance of the light radiated from the wavelength conversion film is reduced.

In contrast, in the barrier film 10 of the present invention, the light diffusion layer 20 has a constitution in which light diffusion layer 20 is obtained by dispersing the light diffusion agent in a binder containing, as a main component, the first component which is a urethane acryl graft copolymer having a low refractive index and preferably having a large molecular weight and a high double bond equivalent and further containing the second component which is an acryl polymer having methacrylate as a side chain and a high glass transition temperature (Tg) and the third component which is a urethane acryl graft copolymer improving adhesiveness and having a polycarbonate group-terminated urethane side chain.

The barrier film 10 of the present invention having the light diffusion layer 20 has high transparency and high light diffusion properties. Furthermore, even though blue light of high intensity is incident on the barrier film 10 of the present invention, the yellowing of the light diffusion layer 20 can be inhibited. In addition, the barrier film 10 of the present invention exhibits high durability against light or heat by preventing the peeling occurring in the interface between the light diffusion layer 20 and the support.

In the barrier film 10 of the present invention, the first component, which is a main component of the binder of the light diffusion layer 20, is an ultraviolet-curable urethane acryl graft copolymer having an acryl polymer as a main chain and an acryloyl group-terminated urethane polymer and/or an acryloyl group-terminated urethane oligomer as a side chain.

By curing and preferably by thermal curing of the urethane polymer and/or the urethane oligomer as the side chain, the first component can be in a crosslinked state. Furthermore, the terminal acryloyl group of the urethane polymer and/or the urethane oligomer as the side chain can remain uncrosslinked.

Therefore, the surface of the light diffusion layer 20 containing the first component as a main component can be in a cured state even in a state where the light diffusion layer 20 is not completely cured. Accordingly, the barrier film 10 of the present invention having such a light diffusion layer 20 or further having the adhesion layer 18 has excellent handleability and can be wound. Therefore, the barrier film 10 can be suitably used even in RtoR.

The terminal acryloyl group of the urethane polymer and/or the urethane oligomer as the side chain of the first component may remain uncrosslinked. In this case, similarly to the adhesion layer 18 described above, by the ultraviolet irradiation and the like for curing the wavelength conversion layer at the time of forming the wavelength conversion layer such as a quantum dot layer on the adhesion layer 18 of the barrier film 10, the terminal acryloyl group of the urethane polymer and/or the urethane oligomer as the side chain of the first component can be crosslinked, and the light diffusion layer 20 can be completely cured.

Therefore, according to the barrier film 10 of the present invention, even though the barrier film 10 has the ultraviolet-curable adhesion layer 18 and the light diffusion layer 20, the adhesion layer 18 and the light diffusion layer 20 have hardness which makes it possible to obtain excellent handleability by thermal curing and the like. Furthermore, simply by performing ultraviolet irradiation once at the time of manufacturing a quantum dot film or the like, the light diffusion layer 20 or the light diffusion layer 20 plus the adhesion layer 18 can be completed. Consequently, the yellowing of the light diffusion layer 20 resulting from the ultraviolet irradiation can be prevented, and a barrier film 10 including a light diffusion layer 20 having high transparency and excellent optical characteristics is obtained.

In addition, because the light diffusion layer 20 is completed by ultraviolet curing, high crosslinking properties and a final product having sufficient abrasion resistance can be obtained.

As described above, the first component is an ultraviolet-curable urethane acryl polymer having an acryl polymer as a main chain and an acryloyl group-terminated urethane polymer and/or an acryloyl group-terminated urethane oligomer as a side chain.

The graft copolymer as the first component may be a copolymer having a structure in which a urethane monomer unit is arrayed as a side chain in each of monomer units of the acryl main chain that forms a backbone, and may have a structure generally formed by graft copolymerization.

Such a graft copolymer has high transparency, hardly undergoes yellowing, and can form a light diffusion layer 20 having a low refractive index and excellent light transmittance and light diffusion properties.

The acryl main chain of the first component may be a polymer formed by homopolymerization of each of an acrylate monomer, an ethyl acrylate monomer, and the like, a copolymer of any of these, or a copolymer of any of these with another monomer. For example, it is preferable that the acryl main chain is a copolymer obtained from a (meth) acrylic acid ester and ethylene.

At least some of the side chains bonded to the acryl main chain is a side chain including a urethane polymer unit or a urethane oligomer unit. The graft copolymer may have a plurality of urethane polymer units having different molecular weights or a plurality of urethane oligomer units having different molecular weights. The molecular weight of the urethane polymer unit may be 3,000 to 4,000 for example. The molecular weight of the urethane oligomer unit may be 350 to 600 for example. The graft copolymer may have both the side chain including a urethane polymer unit and the side chain including a urethane oligomer unit.

The acryl main chain and the urethane polymer unit or the urethane oligomer unit may be bonded to each other directly or through another linking group. Examples of another linking group include an ethylene oxide group, a polyethylene oxide group, a propylene oxide group, a polypropylene oxide group, and the like. The graft copolymer may have a plurality of kinds of side chains in which the urethane polymer unit or the urethane oligomer unit is bonded to the main chain through different linking groups (including a direct bond).

At least some of the side chains having the urethane polymer unit or the urethane oligomer unit have an acryloyl group on a terminal thereof. It is preferable that in the graft copolymer, all of the side chains having the urethane polymer unit or the urethane oligomer unit have an acryloyl group on a terminal thereof.

The first component may have another side chain in addition to the side chain having the urethane polymer unit or the urethane oligomer unit. Examples of another side chain include a linear or branched alkyl group. As the linear or branched alkyl group, a linear alkyl group having 1 to 6 carbon atoms is preferable, a n-propyl group, an ethyl group, or a methyl group is more preferable, and a methyl group is even more preferable.

The first component may have a structure including a plurality of kinds of side chains that differ from each other in terms of the molecular weight of the urethane polymer unit or the urethane oligomer unit, the linking group, and the like and having a plurality of kinds of another side chain described above.

The weight-average molecular weight of the first component is preferably 10,000 to 300,000, more preferably 50,000 to 250,000, and particularly preferably 100,000 to 150,000.

In a case where the weight-average molecular weight of the first component is equal to or greater than 10,000 and particularly equal to or greater than 50,000, it is possible to prevent the evaporation caused at the drying temperature in a falling-rate drying state of the polymerizable composition (coating composition) forming the light diffusion layer 20 so as to form a light diffusion layer 20 having a desired thickness. Furthermore, by the polymerizable composition having sufficient viscosity, flowing of the light diffusion agent can be controlled. In addition, it is possible to inhibit curling occurring at the time of crosslinking the light diffusion layer 20. Moreover, even though light of high intensity is incident on the light diffusion layer from a light source such as LED, the polymerization of the uncured binder components and the decomposition and repolymerization of the binder can be prevented, and the peeling occurring in the interface between the support 12 and the light diffusion layer 20 can be more suitably inhibited. As a result, it is possible to more suitably prevent the deterioration of the light-transmitting properties of the barrier film 10 or the detachment of the light diffusion layer 20.

In a case where the weight-average molecular weight of the first component is equal to or smaller than 300,000, the viscosity of the polymerizable composition can be appropriately maintained, a dilution factor of the polymerizable composition can be easily controlled, and the polymerizable composition can be easily controlled by reducing a drying load caused in a case where a large amount of solvent needs to be dried.

As described above, the first component is an acryl polymer having an acryloyl group-terminated urethane side chain. The double bond equivalent (acryl equivalent) of the first component is preferably equal to or greater than 1,000 g/mol, and more preferably equal to or greater than 1,200 g/mol.

In a case where the acryl equivalent of the first component is equal to or greater than 1,000 g/mol, it is possible to prevent curling caused by cure shrinkage and to further improve the transmittance or the light diffusion properties of the light diffusion layer 20 by reducing the amount of acryl with respect to the total amount of the first component and preventing yellowing or the like resulting from the decomposition of acryl.

The upper limit of the double bond equivalent of the first component is not particularly limited. However, in a case where the double bond equivalent is too large, that is, in a case where the amount of terminal acryloyl groups contained in the side chain is too small, problems including the occurrence of a defect resulting from the hardness of the light diffusion layer 20, such as the deterioration of abrasion resistance resulting from insufficient curing, are likely to occur.

Considering the above point, the double bond equivalent of the graft copolymer is more preferably equal to or smaller than 2,000 g/mol.

The refractive index of a cured material of the first component is preferably 1.44 to 1.52, and more preferably 1.45 to 1.5.

In a case where the refractive index of the first component is within the above range, the transmittance can be increased, and the light diffusion performance of the light diffusion layer 20 can be improved by obtaining a sufficient difference between the refractive index of the first component and the refractive index of the silicone resin particles which is a light diffusion agent.

As the first component, for example, commercial products such as an ACRIT 8BR series including ACRIT 8BR-600 which is an ultraviolet-curable urethane acryl polymer manufactured by TAISEI FINE CHEMICAL CO., LTD. may be used.

Furthermore, a plurality of first components may be used in combination.

In the barrier film 10 of the present invention, the second component constituting the binder of the light diffusion layer 20 is an ultraviolet-curable acryl polymer which has an acryl polymer as a main chain and methacrylate as a side chain.

The acryl polymer as the second component may be a polymer having methacrylate in each of the monomer units of the acryl main chain that forms a backbone.

A cured material of the acryl polymer as the second component has high Tg.

Therefore, in a case where the light diffusion layer 20 has the second component, the heat resistance of the light diffusion layer 20 can be improved. Furthermore, because the side chain of the second component is not acrylate but methacrylate, although Tg, that is, the crosslinking density thereof is high, even in a case where light of high intensity is incident on the light diffusion layer, polymerization does not proceed further, and decomposition by heat or light does not easily occur. Accordingly, in a case where the light diffusion layer 20 has the second component, it is possible to prevent the decomposition of the binder caused by the incidence of the light of high intensity and to prevent the yellowing of the light diffusion layer 20.

The acryl main chain in the second component may be a polymer formed by the homopolymerization of each of an acrylate monomer, an ethyl acrylate monomer, and the like, a copolymer of any of these, or a copolymer of any of these with another monomer. For example, it is preferable that the acryl main chain is a copolymer obtained from an acrylic acid ester and ethylene.

The side chain bonded to the acryl main chain is methacrylate (methacryloyl group).

The second component may have another side chain in addition to the methacrylate. Examples of another side chain include a linear alkyl group or a branched alkyl group. As the linear alkyl group or the branched alkyl group, a linear alkyl group having 1 to 6 carbon atoms is preferable, a n-propyl group, an ethyl group, or a methyl group is more preferable, and a methyl group is even more preferable.

The weight-average molecular weight of the second component is preferably 10,000 to 40,000, more preferably 15,000 to 35,000, and particularly preferably 20,000 to 30,000.

It is preferable that the weight-average molecular weight of the second component is equal to or greater than 10,000, because then it is possible to prevent the evaporation caused at the drying temperature in a falling-rate drying state of the polymerizable composition forming the light diffusion layer 20 so as to form a light diffusion layer 20 having a desired thickness, and to control the flowing of the light diffusion agent by the polymerizable composition having sufficient viscosity.

In addition, it is preferable that the weight-average molecular weight of the second component is equal to or smaller than 40,000, because then the viscosity of the polymerizable composition can be appropriately maintained, a dilution factor of the polymerizable composition can be easily controlled, and the polymerizable composition can be easily controlled by reducing a drying load caused in a case where a large amount of solvent needs to be dried.

As described above, the second component is an acryl polymer having a methacrylate side chain. The double bond equivalent (acryl equivalent) of the second component is preferably 200 to 700 g/mol, and more preferably 300 to 600 g/mol.

It is preferable that the acryl equivalent of the second component is within the above range, because then the yellowing of the light diffusion layer 20 resulting from the decomposition of the binder can be suitably prevented, and the hardness of the coating film can be maintained.

The refractive index of a cured material of the second component is preferably 1.46 to 1.52, and more preferably 1.47 to 1.5.

In a case where the refractive index of the second component is within the above range, the transmittance can be increased, and the light diffusion performance of the light diffusion layer 20 can be improved by obtaining a sufficient difference between the refractive index of the second component and the refractive index of the silicone resin particles as a light diffusion agent.

As described above, Tg of a cured material of the second component is high. Tg of the cured material of the second component is preferably equal to or higher than 100° C., and more preferably equal to or higher than 110° C.

It is preferable that Tg of the cured material of the second component is equal to or higher than 100° C., because then the durability of the light diffusion layer 20 against light or heat can be improved.

As the second component, for example, commercial products including an ACRIT 8KX series such as ACRIT 8KX-012C or ACRIT 8KX-056 which is an ultraviolet-curable acryl polymer manufactured by TAISEI FINE CHEMICAL CO., LTD. may be used.

Furthermore, a plurality of second components may be used in combination.

In the barrier film 10 of the present invention, the binder of the light diffusion layer 20 has not only the aforementioned first component but also the second component and the third component. Accordingly, a light diffusion layer 20 which has high transparency and light diffusion properties and exhibits high durability against light or heat is realized.

As described above, the third component is a urethane-modified acryl graft copolymer which has an acryl polymer as a main chain and a polycarbonate group-terminated urethane polymer and/or a polycarbonate group-terminated urethane oligomer as a side chain.

Because the third component has urethane in the side chain, the adhesiveness thereof is extremely high. Accordingly, in a case where the binder of the light diffusion layer 20 has the third component, the adhesiveness between the light diffusion layer 20 and the support 12 can be greatly improved. Furthermore, because the third component has a polycarbonate group on the terminal of the urethane side chain, the decomposition of the urethane side chain caused by light or heat can be prevented. Therefore, the third component exhibits high durability against light or heat. Consequently, in a case where the binder of the light diffusion layer 20 has the third component, the heat resistance of the light diffusion layer 20 can also be improved.

The graft copolymer (urethane-modified acryl polymer) as the third component may be a copolymer having a structure in which the polycarbonate group-terminated urethane monomer unit is arrayed as a side chain in each of the monomer units of the acryl main chain that forms a backbone, and may have a structure that is generally formed by graft copolymerization.

The acryl main chain in the third component may be a polymer formed by homopolymerization of each of an acrylate monomer, an ethyl acrylate monomer, and the like, a copolymer of any of these, or a copolymer of any of these with another monomer. For example, it is preferable that the acryl main chain is a copolymer obtained from a (meth)acrylic acid ester and ethylene.

The side chain bonded to the acryl main chain is a side chain containing a urethane polymer unit or a urethane oligomer unit. The graft copolymer may have a plurality of urethane polymer units having different molecular weights or a plurality of urethane oligomer units having different molecular weights. The molecular weight of the urethane polymer unit may be 1,000 to 5,000 for example. The molecular weight of the urethane oligomer unit may be 200 to 500 for example. The third component may have both the side chain containing the urethane polymer unit and the side chain containing the urethane oligomer unit.

The third component has a polycarbonate group on the terminal of the urethane side chain. The polycarbonate group is obtained by the polymerization of a monomer unit having a carbonate group.

One polycarbonate group may be a polymer constituted with the same monomer units or a copolymer constituted with a plurality of monomer units different from each other.

The polycarbonate groups of the urethane side chains may have the same molecular weight or the same structure, or may have different molecular weights or different structures.

The third component may have another side chain in addition to the side chain containing the urethane polymer unit or the urethane oligomer unit. Examples of another side chain include a (meth)acryloyl group and a linear or branched alkyl group. As the linear or branched alkyl group, a linear alkyl group having 1 to 6 carbon atoms is preferable, a n-propyl group, an ethyl group, or a methyl group is more preferable, and a methyl group is even more preferable.

The third component may have a structure including a plurality of kinds of side chains different from each other in terms of the molecular weight of the urethane polymer unit or the urethane oligomer unit, the linking group, and the like and a plurality of another side chains described above.

The weight-average molecular weight of the third component is preferably 20,000 to 60,000, and more preferably 30,000 to 50,000.

It is preferable that the weight-average molecular weight of the third component is equal to or greater than 20,000, because then it is possible to prevent the evaporation caused at the drying temperature in a falling-rate drying state of the polymerizable composition forming the light diffusion layer 20 so as to form a light diffusion layer 20 having a desired thickness, and the flowing of the light diffusion agent can be controlled by the polymerizable composition having sufficient viscosity.

In addition, it is preferable that the weight-average molecular weight of the third component is equal to or smaller than 60,000, because then the viscosity of the polymerizable composition can be appropriately maintained, a dilution factor of the polymerizable composition can be easily controlled, and the polymerizable composition can be easily controlled by reducing a drying load caused in a case where a large amount of solvent needs to be dried.

The refractive index of a cured material of the third component is preferably 1.46 to 1.52, and more preferably 1.47 to 1.50.

In a case where the refractive index of the third component is within the above range, the transmittance can be increased, and the light diffusion performance of the light diffusion layer 20 can be improved by obtaining a sufficient difference between the refractive index of the third component and the refractive index of the silicone resin particles as a light diffusion agent.

Tg of the cured material of the third component is preferably equal to or higher than 40° C., and more preferably equal to or higher than 50° C.

It is preferable that Tg of the cured material of the third component is equal to or higher than 40° C., because then the durability of the light diffusion layer 20 against light or heat can be improved.

As such a third component, for example, commercial products including polycarbonate-based polymers of an ACRIT 8UA series such as ACRIT 8UA-347H or ACRIT 8UA-540H which is a urethane-modified acryl polymer manufactured by TAISEI FINE CHEMICAL CO., LTD. may be used.

Furthermore, a plurality of third components may be used in combination.

In the binder forming the light diffusion layer 20, the quantitative ratio between the first component, the second component, and the third component is not limited as long as the first component is a main component, that is, as long as the amount of the first component is the largest in the binder.

According to the examination conducted by the inventors of the present invention, the amount of the first component in the binder is preferably 50% to 70% by mass, and more preferably 55% to 65% by mass.

The amount of the second component in the binder is preferably 15% to 20% by mass, and more preferably 17.5% to 22.5% by mass.

The amount of the third component in the binder is preferably 15% to 25% by mass, and more preferably 17.5% to 22.5% by mass.

Accordingly, in the polymerizable composition forming the light diffusion layer 20 which will be described later, it is preferable to set the amount of the first component, the second component, and the third component added such that the concentration of solid contents becomes the amount described above.

It is preferable that the quantitative ratio between the components in the light diffusion layer 20 is within the above range, because then a light diffusion layer 20 having a high light transmittance is obtained, a light diffusion layer 20 having high light diffusion properties is obtained, and the durability of the light diffusion layer 20 against light or heat can be improved.

In the barrier film 10 of the present invention, if necessary, a urethane acrylate polymer and/or a urethane acrylate oligomer may be added to the binder of the light diffusion layer 20.

In a case where the aforementioned plastic material is added to the binder, curling of the barrier film 10 can be inhibited.

As the urethane acrylate polymer and the urethane acrylate oligomer, it is possible to use various urethane-based compounds which can form a cured material having ductility and can be cured by ultraviolet rays.

The refractive index of cured materials of the urethane acrylate polymer and the urethane acrylate oligomer is preferably 1.45 to 1.49, and more preferably 1.46 to 1.48.

In a case where the refractive index of the urethane acrylate polymer and the urethane acrylate oligomer added to the binder is within the above range, the transmittance can be increased, and the light diffusion performance of the light diffusion layer 20 can be improved by obtaining a sufficient difference between the refractive index of the urethane acrylate polymer and the urethane acrylate oligomer and the refractive index of the silicone resin particles which is a light diffusion agent.

The weight-average molecular weight of the urethane acrylate polymer is preferably 10,000 to 500,000, and the molecular weight of the urethane acrylate oligomer is preferably 1,000 to 10,000.

It is preferable that the molecular weight of the urethane acrylate polymer and the urethane acrylate oligomer is within the above range, because then the viscosity of the polymerizable composition forming the light diffusion layer 20 can be made appropriate.

As the urethane acrylate polymer or the urethane acrylate oligomer, commercial products such as CN9178NS manufactured by Sartomer and the like can be used.

The content of the urethane acrylate polymer and/or the urethane acrylate oligomer in the binder may be appropriately set within a range that does not impair the characteristics of the binder forming the light diffusion layer 20.

Specifically, the content is preferably 5% to 15% by mass, and more preferably 7.5% to 12.5% by mass.

It is preferable that the content of the urethane acrylate polymer and/or the urethane acrylate oligomer is within the above range, because then the curling of the barrier film 10 can be suitably inhibited, and the transparency can be maintained, without impairing neither the transmittance or the light diffusion properties of the light diffusion layer 20 nor the durability of the light diffusion layer 20 against heat or light.

In the light diffusion layer 20, for example, for the purpose of controlling the refractive index of the binder, the binder may be used in combination with various curable monomer, dimer, trimer, oligomer, polymer, and the like such as a curable acrylic resin, a curable urethane acrylate resin, a curable urethane resin, and a curable epoxy resin.

As the above resins, various curable monomers or polymers can be used.

Furthermore, various commercial products can also be used. Examples thereof include ACRIT 8UX-015A (ultraviolet-curable urethane acrylate) or an ACRIT 8DK series (ultraviolet-curable acrylic resins) manufactured by TAISEI FINE CHEMICAL CO., LTD., an OGSOL series (curable acrylic resins) manufactured by Osaka Gas Chemicals Co., Ltd., and the like.

The content of the aforementioned curable monomer, polymer, or the like in the light diffusion layer 20 is preferably equal to or smaller than 90% by mass and more preferably equal to or smaller than 85% by mass with respect to the binder.

In the light diffusion layer 20 of the barrier film 10 of the present invention, the refractive index of the binder is preferably equal to or lower than 1.52, and more preferably equal to or lower than 1.5. Furthermore, the refractive index of the binder is preferably equal to or higher than 1.43.

It is preferable that the refractive index of the binder is equal to or lower than 1.52, because then the reflectivity of the light diffusion layer 20 can be reduced, the transmittance can be increased, and hence the light extraction efficiency can be improved.

It is preferable that the refractive index of the binder is equal to or higher than 1.43, because then the light diffusion performance of the light diffusion layer 20 can be improved by obtaining a sufficient difference between the refractive index of the binder and the refractive index of the silicone resin particles as a light diffusion agent.

The refractive index of the binder can be controlled, for example, by controlling the mixing ratio between the first component, the second component, and the third component. In addition, additives may be added such that the refractive index of the binder falls into the above range. Specifically, by adding a refractive index adjusting agent which is an inorganic oxide such as $TiO_2$, $SiO_2$, or $Al_2O_3$, the refractive index may be controlled.

In the light diffusion layer 20 of the barrier film 10 of the present invention, Tg of the binder is preferably equal to or higher than 50° C., and more preferably equal to or higher than 60° C.

It is preferable that Tg of the binder of the light diffusion layer 20 is equal to or higher than 50° C., because then the durability of the light diffusion layer 20 against light or heat can be improved.

The refractive index and Tg of the binder of the light diffusion layer 20 is a refractive index and Tg measured after crosslinking (curing).

In addition, in a case where the gas barrier film with a light diffusion layer of the present invention is used in a functional laminated film such as a wavelength conversion film (quantum dot film) which will be described later, at a point in time when the gas barrier film finally becomes the wavelength conversion film, the refractive index and Tg of the binder of the light diffusion layer 20 may be in a state satisfying the above range.

In the present invention, Tg of the binder or the like may be measured by differential scanning calorimetry based on JIS K 7121.

The light diffusion layer 20 is constituted with the tri-component binder which has the first component, the second component, and the third component and the silicone resin particles as a light diffusion agent dispersed in the binder.

The binder of the light diffusion layer 20 that contains the first component as a main component has a low refractive index and a high transmittance. Furthermore, the silicone resin particles have a low refractive index. In the present invention, by using the silicone resin particles as a light diffusion agent, a light diffusion layer 20 having a high transmittance and excellent light diffusion properties is realized. In addition, the silicone resin particles exhibit excellent adhesiveness with respect to the binder, particularly, to the first component.

As the silicone resin particles that become a light diffusion agent, commercial products can also be suitably used.

Examples thereof include a TOSPEARL series as silicone resin particles manufactured by Momentive Performance Materials Inc., silicone resin powder manufactured by Shin-Etsu Silicone, and the like.

The particle diameter of the light diffusion agent is not particularly limited, and may be appropriately set according to the refractive index of the light diffusion agent, the difference in refractive index between the light diffusion agent and the binder, and the like.

According to the examination conducted by the inventors of the present invention, the particle diameter of the light diffusion agent is preferably equal to or greater than 0.5 µm, more preferably 0.5 to 30 µm, and still more preferably 2 to 20 µm.

It is preferable that the particle diameter of the light diffusion agent is equal to or greater than 0.5 µm, because then an excellent light diffusion effect is obtained.

As the light diffusion agent, two kinds of light diffusion agents (silicone resin particles) having different particle diameters (sizes) may also be used. It is preferable to use two kinds of light diffusion agents having different particle diameters, because then the luminance of light radiated from the quantum dot film can be improved, and a luminance distribution with respect to a viewing angle at the time of using LCD or the like can be controlled by controlling a ratio between internal scattering and external scattering.

In a case where two kinds of light diffusion agents having different particle diameters are used, in view of imparting internal scattering properties, the particle diameter of one of the light diffusion agents is preferably 1 to 5 µm, and more preferably 2 to 4 µm. Furthermore, in view of imparting external scattering properties and anti-Newton ring properties, the particle diameter of the other light diffusion agent is preferably 6 to 14 µm, and more preferably 9 to 12 µm.

The two kinds of silicone resin particles having different particle diameters are preferably constituted with first silicone resin particles having a particle diameter of 1 to 5 µm and second silicone resin particles having a particle diameter of 6 to 14 µm. The particle diameter of the first silicone resin particles is more preferably 2 to 4 µm. The particle diameter of the second silicone resin particles is more preferably 9 to 12 µm. In the light diffusion layer 20, "mass of small-diameter particles/mass of large-diameter particles" which represents the total mass of the first silicone resin particles having a small particle diameter with respect to the total mass of the second silicone resin particles having a large particle diameter is preferably 0.6 to 1.4, and more preferably 0.8 to 1.2.

It is preferable that "mass of small-diameter particles/mass of large-diameter particles" is equal to or higher than 0.6, because then the light diffusion agents make a big contribution to the internal scattering, inside haze can be increased, and the scattering properties can be improved.

It is preferable that "mass of small-diameter particles/mass of large-diameter particles" is equal to or lower than 1.4, because then it is possible to control the expansion range of luminance at a viewing angle by obtaining external scattering while maintaining the inside haze (prevent the luminance from expanding too much), and to prevent the occurrence of blocking or Newton rings by sufficiently forming surface asperities.

In the light diffusion layer 20, basically, a refractive index $n1$ of the binder and a refractive index $n2$ of the light diffusion agent may satisfy $n1 > n2$.

According to the examination performed by the inventors of the present invention, "$n1-n2$" which is a difference between the refractive index $n1$ of the binder and the refractive index $n2$ of the light diffusion agent is preferably 0.04 to 0.1, and more preferably 0.06 to 0.08. As described above, the refractive index of the binder is preferably equal to or lower than 1.52, and more preferably equal to or lower than 1.5.

It is preferable that the difference "$n1-n2$" between the refractive index $n1$ of the binder and the refractive index $n2$ of the light diffusion agent is equal to or greater than 0.04, because then excellent light diffusion properties are obtained.

It is preferable that the difference "$n1-n2$" is equal to or smaller than 0.1, because then the scattering intensity at a viewing angle can be controlled.

The particle diameter of the light diffusion agent may be determined, for example, by the observation using a Scanning Electron Microscope (SEM). Specifically, a cross-section of the light diffusion layer 20 is imaged as 5,000× magnification, and then from the obtained image, a primary particle diameter is measured. For particles that are not spherical, the average of the length of a major axis and the length of a minor axis is determined and adopted as a primary particle diameter. The primary particle diameter determined in this way is adopted as the particle size of the aforementioned particles. The particle size shown in examples which will be described later is a value measured using S-3400N which is a scanning electron microscope manufactured by Hitachi High-Technologies Corporation.

The refractive index of the binder and the light diffusion agent may be measured using a known refractive index measuring device based on JIS K 7142. As one of the refractive index measuring devices, a multi-wavelength Abbe refractometer DR-M2 manufactured by ATAGO CO., LTD can be exemplified.

As the particle diameter and the refractive index, numerical values described in a catalog and the like may also be used.

In the light diffusion layer 20, "mass of binder/mass of light diffusion agent" representing the total mass of the binder with respect to the total mass of the light diffusion agent (ratio between the total mass of the binder and the total mass of the light diffusion agent) is preferably 0.3 to 0.65, and more preferably 0.44 to 0.55. That is, in the light diffusion layer 20 of the barrier film 10 of the present invention, it is preferable that the amount of the light diffusion agent is larger than that of the binder in terms of a mass ratio.

It is preferable that "mass of binder/mass of light diffusion agent" is equal to or higher than 0.3, because then the hardness of the light diffusion layer 20 can be improved, and the aggregation and peeling occurring in the light diffusion layer 20 can be prevented.

It is preferable that "mass of binder/mass of light diffusion agent" is equal to or lower than 0.65, because then an excellent light diffusion performance can be obtained.

The thickness of the light diffusion layer 20 may be appropriately set according to the material forming the binder, the type of the light diffusion agent, and the like, such that an intended light diffusion performance, an intended hardness of the light diffusion layer, and the like are obtained.

According to the examination conducted by the inventors of the present invention, the thickness of the light diffusion layer 20 is preferably 5 to 20 µm, and more preferably 7 to 16 µm.

It is preferable that the thickness of the light diffusion layer 20 is equal to or greater than 5 µm, because then an excellent light diffusion performance is obtained.

It is preferable that the thickness of the light diffusion layer 20 is equal to or smaller than 20 µm, because then the barrier film 10 can be prevented from becoming unnecessarily thick, a light diffusion layer 20 having a high transmittance is obtained, and curling can be inhibited.

It is preferable that the thickness of the light diffusion layer 20 is larger than the particle diameter of the light diffusion agent contained in the light diffusion layer 20.

In a case where the thickness of the light diffusion layer 20 is larger than the particle diameter of the particles of the light diffusion agent, it is possible to obtain high light scattering properties by the difference in refractive index between the binder and the particles.

The light diffusion layer 20 may be formed by a known method for forming a layer formed of an organic compound, according to the binder of the light diffusion layer 20 and the like.

For example, the light diffusion layer 20 may be formed by a coating method. That is, first, a polymerizable composition (coating composition) is prepared which contains an organic solvent, the first component, the second component, and the third component described above, and a light diffusion agent. It is preferable that in the polymerizable composition, the concentration of solid contents of the first component, the second component, and the third component is set such that the content of the first component, the second component, and the third component in the binder falls into the aforementioned range.

For the purpose of inhibiting the curling of the barrier film 10, the polymerizable composition (binder) may contain a urethane acrylate polymer and/or a urethane acrylate oligomer. Furthermore, if necessary, a thermal polymerization initiator, a surfactant, a dispersant, and the like may be added to the polymerizable composition. In addition, as described above, two kinds of light diffusion agents having different particle diameters may be used.

Then, a surface, which is opposite to the surface on which the inorganic layer 16 and the like are formed, of the support 12 is coated with the polymerizable composition, and the polymerizable composition is dried by heating. The coating and heating may be performed by a known method. In addition, the polymerizable composition is cured by ultraviolet irradiation, thereby forming the light diffusion layer 20.

At the time of heating and drying performed on the polymerizable composition before the polymerizable composition is cured by ultraviolet irradiation, the first component which is a graft copolymer is crosslinked and cured, and in this way, a sufficiently cured light diffusion layer 20 is obtained. Accordingly, as described above, in the barrier film 10 of the present invention, the terminal acryloyl group of the side chain may remain uncrosslinked simply by performing heating and drying and then cured by the ultraviolet irradiation for forming the quantum dot layer, which will be described later, such that the curing of the light diffusion layer 20 is completed.

The drying temperature of the polymerizable composition forming the light diffusion layer 20 may be appropriately set according to the components of the coating composition, and the like.

During the drying at the time of forming the light diffusion layer 20, it is not preferable that the polymerizable composition is overheated. That is, because the ultraviolet curing of the binder becomes an independent step of the step of forming a quantum dot layer and the like as described above, in a case where only the urethane is in a thermally crosslinked state, in which the internal stress may increase, while the acryloyl group is remaining uncrosslinked, aggregation and peeling locally occur in the acryloyl group, and as a result, a problem such as falling of powder (falling or scraping of particles) is likely to occur. That is, during the drying of the polymerizable composition for forming the light diffusion layer 20, it is preferable that the solvent of the coating composition is sufficiently evaporated, and the composition is not overheated.

Considering the above points, the drying temperature of the polymerizable composition for forming the light diffusion layer 20 is preferably 40° C. to 130° C., and more preferably 50° C. to 110° C. It is preferable that the drying temperature of the polymerizable composition is within the above range, because then the curing of the graft copolymer as the first component can appropriately proceed, and hence the occurrence of falling of powder can be prevented.

If necessary, after the drying of the polymerizable composition, a heating step for causing the thermal curing of the graft copolymer to sufficiently proceed may be performed. The heating temperature of the heating step may be set similarly to the heating temperature during the drying of the polymerizable composition.

At the time of manufacturing the barrier film 10 of the present invention, it is preferable that the light diffusion layer 20 is formed after the organic layer 14 as a base, inorganic layer 16, and the adhesion layer 18 are formed.

It is preferable that the light diffusion layer 20 is formed by RtoR. The light diffusion layer 20 is thicker than the organic layer 14 as a base, the inorganic layer 16, and the adhesion layer 18. Therefore, in a case where the light diffusion layer 20 is formed first, the length of the support 12 which can be wound in the form of a roll is reduced, which leads to a disadvantage in productivity.

Furthermore, as described above, the inorganic layer 16 is formed by a vapor-phase deposition method such as plasma CVD. In a case where the film is formed using RtoR, considering the stability and the like of the support at the time of forming the film, it is preferable to transport the support by winding the support around a cylindrical drum. The light diffusion layer 20 is constituted with a binder in which silicone resin particles are dispersed, and the surface smoothness thereof is poor. Accordingly, in a case where the light diffusion layer 20 is formed first, the adhesiveness between the drum and the support 12 becomes poor, and the process of forming the inorganic layer 16 becomes unstable in some cases. Furthermore, in a case where the light diffusion layer 20 is formed first, it is difficult to control the temperature of the surface, on which the inorganic layer 16 is formed, by heating or cooling the drum.

In the barrier film 10 of the present invention, a transmittance TT1 from the light diffusion layer 20 side is preferably equal to or higher than 88%, and more preferably equal to or higher than 90%. In addition, in the barrier film 10, a difference TT1−TT2 between the transmittance TT1 from the light diffusion layer 20 side and a transmittance TT2 from a side opposite to the light diffusion layer 20 side is preferably 10% to 30%, and more preferably 15% to 25%.

It is preferable that the transmittance TT1 from the light diffusion layer 20 side of the gas barrier film is equal to or higher than 88%, because then the light radiated from a light source can be incident on the quantum dot layer and the like without the reduction of the amount of the light, and a wavelength conversion film having a high light use efficiency can be obtained.

It is preferable that TT1−TT2 is equal to or greater than 10%, because then a wavelength conversion efficiency can be improved by the internal retroreflection in a case where a quantum dot layer or the like is sandwiched between the barrier films.

It is preferable that TT1−TT2 is equal to or smaller than 30%, because then it is possible to inhibit the leakage of light from an end face by inhibiting the internal retroreflection from excessively occurring in a case where a quantum dot layer or the like is sandwiched between the barrier films.

The haze of the barrier film 10 of the present invention is preferably equal to or higher than 90%, and more preferably equal to or higher than 93%.

It is preferable that the haze of the barrier film 10 is equal to or higher than 90%, because then excellent light diffusion characteristics can be obtained.

The transmittance (total light transmittance) of the barrier film 10 may be measured using a commercial measurement device such as NDH5000 or SH-7000 manufactured by NIPPON DENSHOKU INDUSTRIES Co., LTD based on JIS K 7361.

Furthermore, the haze of the barrier film 10 may be measured using a commercial measurement device such as NDH5000 manufactured by NIPPON DENSHOKU INDUSTRIES Co., LTD based on JIS K 7136.

Figure 2:
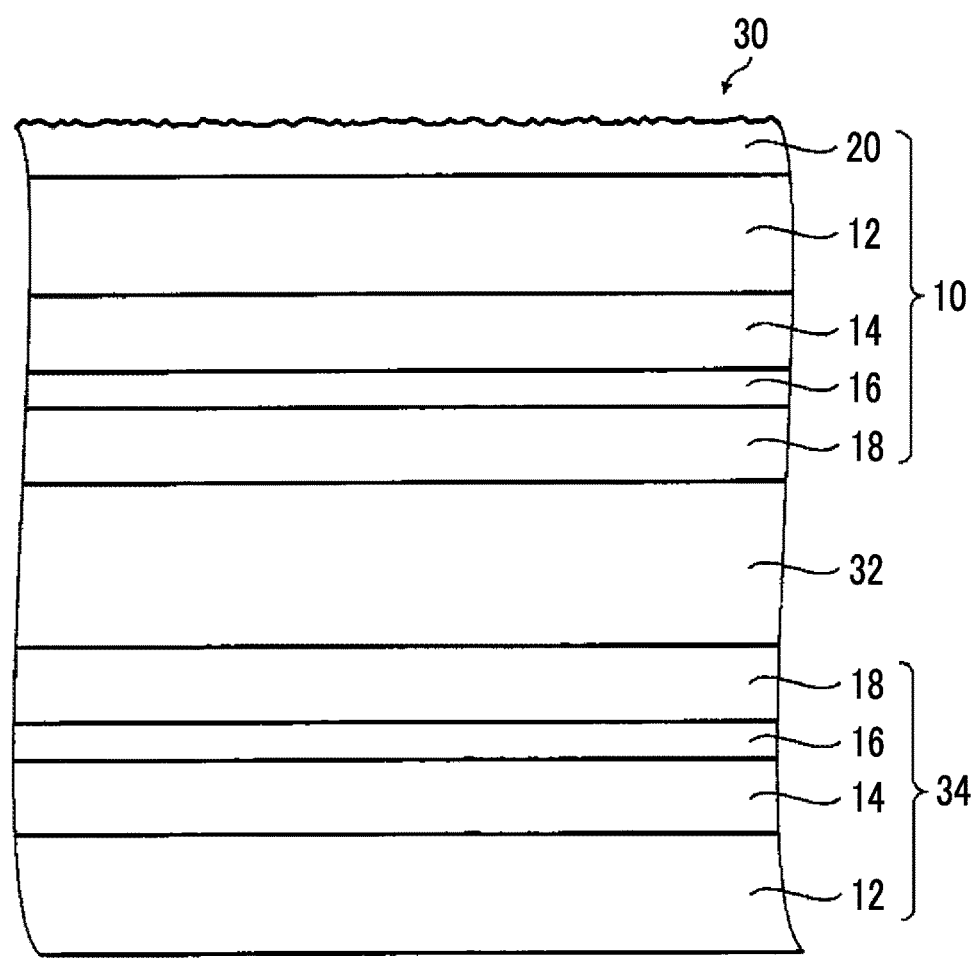
FIG. 2 is a view conceptually showing an example of a wavelength conversion film of the present invention.

FIG. 2 conceptually shows an example of the wavelength conversion film of the present invention that uses the barrier film 10 of the present invention.

A wavelength conversion film 30 shown in FIG. 2 is obtained by sandwiching a quantum dot layer 32 as a wavelength conversion layer between the (gas) barrier film 10 (with a light diffusion layer) of the present invention and a gas barrier film 34. In the following description, "gas barrier film 34" will be referred to as "barrier film 34" as well.

The wavelength conversion film of the present invention is not limited to the aforementioned constitution, and may adopt a constitution in which the barrier film 10 of the present invention is laminated on one surface of the quantum dot layer 32 (wavelength conversion layer).

It is preferable that a gas barrier film is provided on both surfaces of the quantum dot layer 32, because then the deterioration of the quantum dot layer caused by oxygen or the like can be more reliably prevented. Furthermore, a constitution can also be adopted in which the quantum dot layer 32 is sandwiched between two sheets of barrier films 10 of the present invention.

In addition, in the wavelength conversion film of the present invention, in addition to the quantum dot layer, various known wavelength conversion layers can also be used. Examples thereof include a fluorescent layer and the like.

Furthermore, in the barrier film 10 of the present invention, in addition to the wavelength conversion film, various functional laminated films can be used. Examples thereof include a functional laminated film having an organic electroluminescence layer (organic EL layer) and the like.

The wavelength conversion film 30 shown in FIG. 2 is a so-called quantum dot film, in which the quantum dot layer 32 is sandwiched between the barrier film 10 and the barrier film 34 which does not have the light diffusion layer 20 such that the adhesion layers 18 of the barrier film 10 and the barrier film 34 face each other. In other words, the wavelength conversion film 30 has a constitution in which the quantum dot layer 32 is sandwiched between two sheets of gas barrier films disposed to cause the adhesion layers 18 to face each other. In the gas barrier film of the present invention, the adhesion layer is provided as a preferred aspect. A preferred wavelength conversion film has a gas barrier film with a light diffusion layer on one surface of a wavelength conversion layer and has a gas barrier film without a light diffusion layer on the other surface of the wavelength conversion layer. In a more preferred wavelength conversion film, a gas barrier film without a light diffusion layer has a support and a combination of an inorganic layer and an organic layer, which is an underlying base of the inorganic layer, on one surface of the support, in which the surface, on which the organic layer and the inorganic layer are formed (one surface of the support), faces the wavelength conversion layer side. That is, one surface, on which the combination of the inorganic layer and the organic layer is provided, of the support of the gas barrier film without a light diffusion layer faces the side opposite to the surface side, on which the gas barrier film with a light diffusion layer is provided, of the wavelength conversion layer. The constitution of the barrier film 34 is basically the same as that of the barrier film 10 of the present invention, except that the barrier film 34 does not have the light diffusion layer 20.

The quantum dot layer 32 is constituted with quantum dots and a binder (matrix) such as a resin in which the quantum dots are dispersed. The quantum dot layer 32 has a function of emitting light by converting the wavelength of the light incident thereon.

For example, in a case where blue light emitted from a backlight not shown in the drawing is incident on the quantum dot layer 32, by the effect of the quantum dots contained in the quantum dot layer 32, the quantum dot layer 32 performs wavelength conversion, such that at least a portion of the blue light becomes red light or green light, and then emits the light.

The blue light refers to light having an emission wavelength centered at a wavelength range of 400 nm to 500 nm, the green light refers to light having an emission wavelength centered at a wavelength range of 500 nm to 600 nm, and the red light refers to light having an emission wavelength centered at a wavelength range longer than 600 nm and equal to or shorter than 680 nm.

The wavelength conversion function that the quantum dot layer expresses is not limited to the constitution in which the wavelength conversion is performed to change the blue light into the red light or the green light, and only at least a portion of incidence rays needs to be converted into light having a different wavelength.

The quantum dot generates fluorescence by being excited with at least excitation light incident thereon.

The type of the quantum dot contained in the quantum dot layer is not particularly limited, and according to the required wavelength conversion performance or the like, various known quantum dots may be appropriately selected.

Regarding the quantum dot (quantum dot material), for example, paragraphs <0060> to <0066> in JP2012-169271A can be referred to, but the present invention is not limited to those described in the paragraphs. As the quantum dot, commercial products can be used without restriction. Generally, the emission wavelength of the quantum dot can be adjusted by the composition or size of the particles.

One kind of quantum dot may be used singly, or two or more kinds of quantum dots may be used in combination. In a case where two or more kinds of quantum dots are used in combination, two or more kinds of quantum dots that emit light having different wavelengths may be used.

Specifically, known quantum dots include a quantum dot (A) having an emission wavelength centered at a wavelength range of 600 nm to 680 nm, a quantum dot (B) having an emission wavelength centered at a wavelength range of 500 nm to 600 nm, and a quantum dot (C) having a emission wavelength centered at a wavelength range of 400 nm to 500 nm. The quantum dot (A) emits red light by being excited with excitation light, the quantum dot (B) emits green light, and the quantum dot (C) emits blue light. For example, in a case where blue light is caused to incident as excitation light on a quantum dot-containing laminate containing the quantum dot (A) and the quantum dot (B), by the red light emitted from the quantum dot (A), the green light emitted from the quantum dot (B), and the blue light transmitted through the quantum dot layer, white light can be realized. Furthermore, in a case where ultraviolet light is caused to incident as excitation light on the quantum dot layer containing the quantum dots (A), (B), and (C), by the red light emitted from the quantum dot (A), the green light emitted from the quantum dot (B), and the blue light emitted from the quantum dot (C), white light can be realized.

As quantum dots, so-called quantum rods which have a rod shape and emit polarized light with directionality may be used.

As quantum dots, those uniformly dispersed in the binder are preferable. However, the quantum dots may be unevenly dispersed in the binder.

The type of the binder of the quantum dot layer 32 is not particularly limited, and various resins used in known quantum dot layers can be used.

Examples of the binder include a polyester-based resin (for example, polyethylene terephthalate and polyethylene naphthalate), a (meth)acrylic resin, a polyvinyl chloride-based resin, a polyvinylidene chloride-based resin, and the like.

Alternatively, as the binder, it is possible to use a binder obtained by curing (polymerizing/crosslinking) a curable compound (polymerizable compound (polymerizable monomer)) having one or more polymerizable groups (crosslinkable groups). In the curable compound having two or more polymerizable groups, the polymerizable groups may be the same as or different from each other.

The type of the polymerizable group is not particularly limited. However, the polymerizable group is preferably a (meth)acryloyl group, a vinyl group, or an epoxy group, more preferably a (meth)acryloyl group, and even more preferably an acryloyl group. That is, in the present invention, as the binder of the quantum dot layer, a (meth)acrylic resin is preferable, and an acrylic resin is more preferable.

As described above, in the barrier film 10, the adhesion layer 18 contains a urethane polymer containing an uncross-linked (meth)acryloyl group and a phosphoric acid compound and/or a silane coupling agent.

Accordingly, in a case where the quantum dot layer 32 is formed by curing a curable compound containing a (meth)acryloyl group as a polymerizable group, at the time of curing the quantum dot layer 32, the (meth)acryloyl group in the quantum dot layer 32 and the (meth)acryloyl group in the adhesion layer 18 suitably react with each other and are crosslinked. As a result, the adhesiveness between the adhesion layer 18 and the quantum dot layer 32 can be improved.

It is preferable that the curable compound forming the quantum dot layer 32 has a molecular weight equal to or smaller than 500.

It is preferable that the quantum dot layer 32 is formed using the curable compound having a molecular weight equal to or smaller than 500, because then the curable compound can be easily incorporated into the matrix structure of the adhesion layer 18, and the adhesiveness between the adhesion layer 18 and the quantum dot layer 32 can be improved.

Specifically, in the quantum dot layer 32, for example, a resin obtained by curing a curable composition containing a first curable compound and a second curable compound described below can be used as a binder.

The first curable compound is preferably one or more compounds selected from the group consisting of a (meth)acrylate monomer having two or more functional groups and a monomer having two or more functional groups selected from the group consisting of an epoxy group and an oxetanyl group.

Examples of the (meth)acrylate monomer having two or more functional groups preferably include difunctional (meth)acrylate monomers such as neopentyl glycol di(meth)acrylate, 1,9-nonanediol di(meth)acrylate, tripropylene glycol di(meth)acrylate, ethylene glycol di(meth)acrylate, tetraethylene glycol di(meth)acrylate, hydroxypivalic acid neopentyl glycol di(meth)acrylate, polyethylene glycol di(meth)acrylate, dicyclopentenyl (meth)acrylate, dicyclopentenyloxyethyl (meth)acrylate, and dicyclopentanyl di(meth)acrylate.

Examples of the (meth)acrylate monomer having two or more functional groups preferably include (meth)acrylate monomers having three or more functional groups such as ECH-modified glycerol tri(meth)acrylate, EO-modified glycerol tri(meth)acrylate, PO-modified glycerol tri(meth)acrylate, pentaerythritol triacrylate, pentaerythritol tetraacrylate, EO-modified phosphoric acid triacrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth)acrylate, tris(acryloxyethyl)isocyanurate, dipentaerythritol hexa(meth)acrylate, dipentaerythritol penta(meth)acrylate, caprolactone-modified dipentaerythritol hexa(meth)acrylate, dipentaerythritol hydroxypenta(meth)acrylate, alkyl-modified dipentaerythritol penta(meth)acrylate, dipentaerythritol poly(meth)acrylate, alkyl-modified dipentaerythritol tri(meth)acrylate, ditrimethylolpropane tetra(meth)acrylate, pentaerythritol ethoxy tetra(meth)acrylate, and pentaerythritol tetra(meth)acrylate.

As the monomer having two or more functional groups selected from the group consisting of an epoxy group and an oxetanyl group, an aliphatic cyclic epoxy compound, bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, hydrogenated bisphenol A diglycidyl ether, hydrogenated bisphenol F diglycidyl ether, hydrogenated bisphenol S diglycidyl ether, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers; polyglycidyl ethers of polyether polyol obtained by adding one kind or two or more kinds of alkylene oxide to an aliphatic polyhydric alcohol such as ethylene glycol, propylene glycol, or glycerin; diglycidyl esters of aliphatic long-chain dibasic acid; glycidyl esters of higher fatty acids; a compound containing epoxycycloalkane, and the like are suitably used.

Examples of commercial products that can be suitably used as the monomer having two or more functional groups selected from the group consisting of an epoxy group and an oxetanyl group include CELLOXIDE 2021P and CELLOXIDE 8000 manufactured by Daicel Corporation, 4-vinylcyclohexene dioxide manufactured by Sigma-Aldrich Co. LLC., and the like. One kind of these monomers can be used singly, or two or more kinds of these monomers can be used in combination.

The monomer having two or more functional groups selected from the group consisting of an epoxy group and an oxetanyl group may be prepared by any method. For example, the monomer can be synthesized with reference to the documents such as "Experimental Chemistry Course 20, Organic Synthesis II", pp. 213~, 1992, MARUZEN SHUPPAN K.K, "The chemistry of heterocyclic compounds-Small Ring Heterocycles, part 3 Oxiranes", Ed. By Alfred Hasfner, John & Wiley and sons, An Interscience Publication, New York, 1985, "Adhesion", Yoshimura, Vol. 29, No. 12, 32, 1985, "Adhesion", Yoshimura, Vol. 30, No. 5, 42, 1986, "Adhesion", Yoshimura, Vol. 30, No. 7, 42, 1986, JP1999-100378A (JP-H11-100378A), JP2906245B, and JP2926262B.

The second curable compound has a functional group which has hydrogen bonding properties in a molecule and a polymerizable group which can cause a polymerization reaction with the first curable compound.

Examples of the functional group having hydrogen bonding properties include a urethane group, a urea group, a hydroxyl group, and the like.

In a case where the first curable compound is a (meth) acrylate monomer having two or more functional groups, the polymerizable group which can cause a polymerization reaction with the first curable compound may be a (meth) acryloyl group, for example. In a case where the first curable compound is a monomer having two or more functional groups selected from the group consisting of an epoxy group and an oxetanyl group, the polymerizable group which can cause a polymerization reaction may be an epoxy group or an oxetanyl group.

Examples of the (meth)acrylate monomer containing a urethane group include monomers and oligomers obtained by reacting diisocyanate such as TDI, MDI, HDI, IPDI, and HMDI with polyol such as poly(propyleneoxide)diol, poly (tetramethyleneoxide)diol, ethoxylated bisphenol A, ethoxylated bisphenol S spiroglycol, caprolactone-modified diol, and carbonate diol and hydroxyacrylate such as 2-hydroxyethyl (meth)acrylate, 2-hydroxypropyl (meth)acrylate, glycidol di(meth)acrylate, and pentaerythritol triacrylate, and polyfunctional urethane monomers described in JP2002-265650A, JP2002-355936A, JP2002-067238A, and the like. Specifically, examples thereof include an adduct of TDI and hydroxyethyl acrylate, an adduct of IPDI and hydroxyethyl acrylate, an adduct of HDI and pentaerythritol triacrylate (PETA), a compound obtained by making an adduct of TDI and PETA and reacting the remaining isocyanate with dodecyloxyhydroxypropyl acrylate, an adduct of 6,6 nylon and TDI, an adduct of pentaerythritol, TDI, and hydroxyethyl acrylate, and the like, but the present invention is not limited to these.

Examples of commercial products that can be suitably used as the (meth)acrylate monomer containing a urethane group include AH-600, AT-600, UA-306H, UA-306T, UA-306I, UA-510H, UF-8001G, and DAUA-167 manufactured by KYOEISHA CHEMICAL Co., LTD., UA-160™ manufactured by SHIN-NAKAMURA CHEMICAL CO., LTD., UV-4108F and UV-4117F manufactured by OSAKA ORGANIC CHEMICAL INDUSTRY LTD., and the like. One kind of these monomers can be used singly, or two or more kinds of these monomers can be used in combination.

Examples of the (meth)acrylate monomer containing a hydroxyl group include a compound synthesized by causing a reaction between a compound having an epoxy group and (meth)acrylic acid. Typical examples of the monomer are classified into, depending on the compound having an epoxy group, a bisphenol A type, a bisphenol S type, a bisphenol F type, an epoxidized oil type, a phenol novolac type, and alicyclic type. Specific examples of the monomer include (meth)acrylate obtained by reacting an adduct of bisphenol A and epichlorohydrin with (meth)acrylic acid, (meth)acrylate obtained by reacting phenol novolac with epichlorohydrin and then reacting the product with (meth)acrylic acid, (meth)acrylate obtained by reacting an adduct of bisphenol S and epichlorohydrin with (meth)acrylic acid, (meth)acrylate obtained by reacting epoxidized soybean oil with (meth) acrylic acid, and the like. Examples of the (meth)acrylate monomer having a hydroxyl group also include a (meth) acrylate monomer having a carboxyl group or a phosphoric acid group on the terminal, and the like, but the present invention is not limited thereto.

Examples of commercial products that can be suitably used as the second curable compound containing a hydroxyl group include epoxy ester, M-600A, 40EM, 70PA, 200PA, 80MFA, 3002M, 3002A, 3000MK, and 3000A manufactured by KYOEISHA CHEMICAL Co., LTD., 4-hydroxybutyl acrylate manufactured by Nippon Kasei Chemical Co., Ltd., monofunctional acrylate A-SA and monofunctional methacrylate SA manufactured by SHIN-NAKAMURA CHEMICAL CO., LTD., monofunctional acrylate β-carboxyethyl acrylate manufactured by DAICEL-ALLNEX LTD., JPA-514 manufactured by JOHOKU CHEMICAL CO., LTD, and the like. One kind of these can be used singly, or two or more kinds of these can be used in combination.

A mass ratio of first curable compound:second curable compound may be 10:90 to 99:1, and is preferably 10:90 to 90:10. It is preferable that the content of the first curable compound is greater than the content of the second curable compound. Specifically, (content of first curable compound)/(content of second curable compound) is preferably 2 to 10.

In a case where the resin obtained by curing the first curable compound and the second curable compound is used as a binder, it is preferable that the curable composition binder further contains a monofunctional (meth)acrylate monomer as a curable composition. Examples of the monofunctional (meth)acrylate monomer include acrylic acid, methacrylic acid, and derivatives of these, and more specifically include a monomer having one polymerizable unsaturated bond ((meth)acryloyl group) of (meth)acrylic acid in a molecule. Specific examples of the monomer include the following compounds, but the present invention is not limited thereto.

Examples of the monomer include alkyl (meth)acrylate containing an alkyl group having 1 to 30 carbon atoms such as methyl (meth)acrylate, n-butyl (meth)acrylate, isobutyl (meth)acrylate, 2-ethylhexyl (meth)acrylate, isononyl (meth)acrylate, n-octyl (meth)acrylate, lauryl (meth)acrylate, and stearyl (meth)acrylate; aralkyl (meth)acrylate containing an aralkyl group having 7 to 20 carbon atoms, such as benzyl (meth)acrylate; alkoxyalkyl (meth)acrylate containing an alkoxyalkyl group having 2 to 30 carbon atoms, such as butoxyethyl (meth)acrylate; aminoalkyl (meth)acrylate containing a (monoalkyl or dialkyl) aminoalkyl group having 1 to 20 carbon atoms in total, such as N,N-dimethylaminoethyl (meth)acrylate; (meth)acrylate of polyalkylene glycol alkyl ether containing an alkylene chain having 1 to 10 carbon atoms and terminal alkyl ether having 1 to 10 carbon atoms, such as (meth)acrylate of diethylene glycol ethyl ether, (meth)acrylate of triethylene glycol butyl ether, (meth)acrylate of tetraethylene glycol monomethyl ether, (meth)acrylate of hexaethylene glycol monomethyl ether, monomethyl ether (meth)acrylate of octaethylene glycol, monomethyl ether (meth)acrylate of nonaethylene glycol, monomethyl ether (meth)acrylate of dipropylene glycol, monomethyl ether (meth)acrylate of heptapropylene glycol, and monoethyl ether (meth)acrylate of tetraethylene glycol; (meth)acrylate of polyalkylene glycol aryl ether containing an alkylene chain having 1 to 30 carbon atoms and terminal aryl ether having 6 to 20 carbon atoms, such as (meth) acrylate of hexaethylene glycol phenyl ether; (meth)acrylate having an alicyclic structure containing 4 to 30 carbon atoms in total, such as cyclohexyl (meth)acrylate, dicyclopentanyl (meth)acrylate, isobornyl (meth)acrylate, and methylene oxide-added cyclodecatriene (meth)acrylate; fluorinated alkyl (meth)acrylate having 4 to 30 carbon atoms in total such as heptadecafluorodecyl (meth)acrylate; (meth)acrylate having a hydroxyl group such as 2-hydroxyethyl (meth) acrylate, 3-hydroxypropyl (meth)acrylate, 4-hydroxybutyl (meth)acrylate, mono(meth)acrylate of triethylene glycol, tetraethylene glycol mono(meth)acrylate, hexaethylene glycol mono(meth)acrylate, octapropylene glycol mono(meth) acrylate, and mono- or di(meth)acrylate of glycerol; (meth) acrylate having a glycidyl group such as glycidyl (meth) acrylate; polyethylene glycol mono(meth)acrylate having an alkylene chain containing 1 to 30 carbon atoms, such as tetraethylene glycol mono(meth)acrylate, hexaethylene glycol mono(meth)acrylate, and octapropylene glycol mono (meth)acrylate; (meth)acrylamide such as (meth)acrylamide, N,N-dimethyl (meth)acrylamide, N-isopropyl (meth) acrylamide, 2-hydroxyethyl (meth)acrylamide, and acryloylmorpholine; and the like.

The content of the monofunctional (meth)acrylate monomer with respect to the total mass (100 parts by mass) of the first curable compound and the second curable compound is preferably 1 to 300 parts by mass, and more preferably 50 to 150 parts by mass.

Furthermore, it is preferable that the resin contains a compound having a long-chain alkyl group containing 4 to 30 carbon atoms. Specifically, it is preferable that at least any one of the first curable compound, the second curable compound, or the monofunctional (meth)acrylate monomer has a long-chain alkyl group having 4 to 30 carbon atoms. It is preferable that long-chain alkyl group is a long-chain alkyl group having 12 to 22 carbon atoms, because then the dispersibility of the quantum dots is improved. The further the dispersibility of the quantum dots is improved, the further the amount of light that goes straight to an emission surface from a light conversion layer increases. Accordingly, the improvement of the dispersibility of the quantum dots is effective for improving front luminance and front contrast.

Specifically, as the monofunctional (meth)acrylate monomer having a long-chain alkyl group containing 4 to 30 carbon atoms, butyl (meth)acrylate, octyl (meth)acrylate, lauryl (meth)acrylate, oleyl (meth)acrylate, stearyl (meth) acrylate, behenyl (meth)acrylate, butyl (meth)acrylamide, octyl (meth)acrylamide, lauryl (meth)acrylamide, oleyl (meth)acrylamide, stearyl (meth)acrylamide, behenyl (meth)acrylamide, and the like are preferable. Among these, lauryl (meth)acrylate, oleyl (meth)acrylate, and stearyl (meth)acrylate are particularly preferable.

Furthermore, the resin may contain, as a curable compound, a compound having a fluorine atom such as trifluoroethyl (meth)acrylate, pentafluoroethyl (meth)acrylate, (perfluorobutyl)ethyl (meth)acrylate, perfluorobutyl-hydroxypropyl (meth)acrylate, (perfluorohexyl)ethyl (meth) acrylate, octafluoropentyl (meth)acrylate, perfluorooctyl ethyl (meth)acrylate, and tetrafluoropropyl (meth)acrylate. In a case where the resin contains these compounds, the coating properties can be further improved.

The amount of the binder in the quantum dot layer 32 is not particularly limited, and may be appropriately set according to the type of the curable compound to be used, the thickness of the quantum dot layer 32, and the like.

According to the examination conducted by the inventors of the present invention, the amount of the binder with respect to a total of 100 parts by mass of the quantum dot layer 32 is preferably 90 to 99.9 parts by mass, and more preferably 92 to 99 parts by mass.

The thickness of the quantum dot layer 32 is not particularly limited, but is preferably 30 to 200 µm and more preferably 40 to 150 µm.

It is preferable that the thickness of the quantum dot layer 32 is equal to or greater than 30 µm, because then excellent light emitting characteristics are obtained.

It is preferable that the thickness of the quantum dot layer 32 is equal to or smaller than 200 µm, because then the wavelength conversion film 30 can be prevented from becoming unnecessarily thick, a wavelength conversion film 30 having excellent handleability is obtained, and a quantum dot layer 32 having sufficient curing properties (not undergoing aggregation and peeling) can be formed.

The quantum dot layer 32, that is, the wavelength conversion film 30 may also be formed by a known method for forming a layer formed of an organic compound, according to the material forming the quantum dot layer 32.

First, the barrier film 10 is prepared as described above. The barrier film 34 may be prepared by the same method as that used for preparing the barrier film 10, except that the light diffusion layer 20 is not formed.

Meanwhile, quantum dots are dispersed in a curable compound that becomes a binder, thereby preparing a coating composition (polymerizable composition) that becomes the quantum dot layer 32. If necessary, the coating composition may contain a photopolymerization initiator, a surfactant, and the like.

After the barrier film 10 and the barrier film 34 are prepared, and the coating composition that becomes the quantum dot layer 32 is prepared, the adhesion layer 18 of the barrier film 10 or the barrier film 34 is coated with the prepared coating composition.

Then, another barrier film 10 or barrier film 34 is laminated in a state where the adhesion layer 18 is facing the coating composition.

After the coating composition that becomes the quantum dot layer 32 is sandwiched between the barrier films 10, ultraviolet irradiation is performed such that the curable compound in the coating composition that becomes a binder is polymerized, thereby forming the quantum dot layer 32. In this way, the wavelength conversion film 30 is prepared.

At the time of polymerizing the curable compound that becomes a binder, the curable compound (preferably (meth) acrylate) that becomes a binder, the (meth)acryloyl group of the phosphoric acid compound and/or the (meth)acryloyl group of the silane coupling agent in the adhesion layer 18, and the terminal (meth)acryloyl group of the side chain of the urethane polymer react with each other and are bonded to each other as described above. Accordingly, the quantum dot layer 32 and the adhesion layer 18 adhere to each other with strong adhesion.

In addition, in the light diffusion layer 20 of the barrier film 10, the uncrosslinked terminal acryloyl group of the side chain is crosslinked by the ultraviolet irradiation. As a result, the graft copolymer is crosslinked, the binder is completely cured, and the light diffusion layer 20 is completed.

As described above, in manufacturing the wavelength conversion film 30, ultraviolet irradiation is performed only once. Accordingly, the wavelength conversion layer such as the quantum dot layer 32 is prevented from undergoing yellowing due to ultraviolet irradiation, and hence a wavelength conversion film 30 having excellent optical characteristics is obtained.

It is preferable that the wavelength conversion film 30 is manufactured by RtoR.

Hitherto, the gas barrier film with a light diffusion layer and the wavelength conversion film of the present invention have been specifically described, but the present invention is not limited to the above examples. It goes without saying that the present invention may be ameliorated or modified in various ways within a scope that does not depart from the gist of the present invention.

EXAMPLES

Hereinafter, the present invention will be more specifically described based on specific examples of the present invention.

Example 1-1

<Preparation of Barrier Film 10>

The barrier film 10 shown in FIG. 1 was prepared which has the organic layer 14 as a base, the inorganic layer 16, and the adhesion layer 18 on one surface of the support 12 and has the light diffusion layer 20 on the other surface of the support 12.

As the support 12, a PET film (manufactured by Toyobo Co., Ltd., COSMOSHINE A4300) having a width of 1,000 mm, a thickness of 50 μm, and a length of 100 m was used.

<<Formation of Organic Layer 14 as a Base>>

TMPTA (manufactured by Daicel SciTech) and a photopolymerization initiator (ESACURE KT046) were prepared and weighed such that a mass ratio of TMPTA:photopolymerization initiator became 95:5. These components were dissolved in methyl ethyl ketone (MEK) such that the concentration of solid contents thereof became 15% by mass, thereby preparing a coating composition for forming the organic layer 14 as a base.

A predetermined position of a coating portion of a general RtoR film forming device, which had a coating portion using a die coater, a drying zone using hot air, and a curing zone using ultraviolet irradiation, was filled with the coating composition for forming the organic layer 14 as a base. Furthermore, a roll obtained by winding the support 12 in the form of a roll was loaded on a predetermined position of the film forming device, and the support 12 was inserted into a predetermined transport path.

In the film forming device, the support 12 was coated with the coating composition by using a die coater while being transported in a longitudinal direction, and passed through the drying zone with a temperature of 50° C. for 3 minutes. Then, in the curing zone, ultraviolet irradiation (cumulative irradiation amount: about 600 mJ/cm$^2$) was performed so as to cure the coating composition, thereby forming the organic layer 14 as a base. A protective film made of PE was bonded to the surface of the organic layer 14 as a base, and then the resultant was wound up, thereby obtaining a roll in which the organic layer 14 as a base was formed on the support 12. The thickness of the organic layer 14 as a base was 1 μm.

<<Formation of Inorganic Layer 16>>

The roll of the support 12, on which the organic layer 14 as a base was formed, was loaded on a predetermined position of a general CVD film forming device that forms a film by CCP-CVD (capacitively coupled plasma CVD) by using RtoR, and the support 12 was inserted into a predetermined transport path.

In the CVD film forming device, the support 12 on which the organic layer 14 as a base was formed was transported in a longitudinal direction, and in this state, the protective film was peeled. Then, on the organic layer 14 as a base, a silicon nitride film was formed as the inorganic layer 16. A protective film made of PE was bonded to the inorganic layer 16, and then the support 12 was wound up.

As raw material gases, silane gas (flow rate: 160 sccm), ammonia gas (flow rate: 370 sccm), hydrogen gas (flow rate: 590 sccm), and nitrogen gas (flow rate: 240 sccm) were used. As a power source, a high-frequency power source having a frequency of 13.56 MHz was used. A plasma excitation power was set to be 800 W, and a film forming pressure was set to be 40 Pa. The film thickness of the inorganic layer 16 was 50 nm.

<<Formation of Adhesion Layer 18>>

A UV-curable urethane polymer (manufactured by TAISEI FINE CHEMICAL CO., LTD., ACRIT 8UH-1006), urethane polyester (manufactured by Toyobo Co., Ltd., VYLON U1510), a phosphoric acid compound (manufactured by Sigma-Aldrich Co. LLC., BMOP), and a silane coupling agent (manufactured by Shin-Etsu Silicone, KBM 5103) were weighed such that a mass ratio of UV-curable urethane polymer:urethane polyester:phosphoric acid compound:silane coupling agent became 50:15:25:10, and these components were dissolved in MEK such that the concentration of solid contents thereof became 2% by mass, thereby preparing a coating composition for forming the adhesion layer 18.

A predetermined position of a coating portion of a general RtoR film forming device, which had a coating portion using a die coater, a drying zone using heating, and a curing zone using ultraviolet irradiation, was filled with the coating composition for forming the adhesion layer 18. Furthermore, the roll of the support 12, on which the inorganic layer 16 was formed, was loaded on a predetermined position of the film forming device and inserted into a predetermined transport path.

In the film forming device, the support 12 was transported in a longitudinal direction, and in this state, the protective film was peeled. Then, the inorganic layer 16 was coated with the coating composition by using the die coater, and the resultant was passed through the drying zone with a temperature of 110° C. for 3 minutes. Thereafter, in the curing zone, the coating composition was cured by being irradiated with ultraviolet rays (cumulative irradiation amount: about 300 mJ/cm$^2$) in a nitrogen atmosphere, thereby forming the adhesion layer 18.

The coating amount of the coating composition was set to be 5 mL (liters)/m$^2$. The thickness of the formed adhesion layer 18 was 100 nm.

<<Formation of Light Diffusion Layer 20>>

As the first component, ACRIT 8BR-600 (n (refractive index after curing)=1.467, Tg (Tg of cured material)=58° C.) manufactured by TAISEI FINE CHEMICAL CO., LTD. was prepared.

As the second component, ACRIT 8KX012C (n=1.48, Tg=125° C.) manufactured by TAISEI FINE CHEMICAL CO., LTD. was prepared.

As the third component, ACRIT 8UA347H (n=1.48, Tg=54° C.) manufactured by TAISEI FINE CHEMICAL CO., LTD. was prepared.

The first component, the second component, and the third component were mixed together such that the mass ratio of first component:second component:third component became 60:20:20 in terms of solid contents, thereby preparing a binder component.

The binder component was cured by being irradiated with ultraviolet rays, thereby obtaining a binder. By differential scanning calorimetry, Tg of the binder obtained after curing was measured based on JIS K 7121. As a result, Tg was 70° C.

As a small-diameter light diffusion agent, TOSPEARL 130 (average particle diameter: 3 μm, refractive index: 1.42) manufactured by Momentive Performance Materials Inc. was prepared.

As a large-diameter light diffusion agent, TOSPEARL 1100 (average particle diameter: 11 μm, refractive index: 1.42) manufactured by Momentive Performance Materials Inc. was prepared.

Then, the small-diameter light diffusion agent, the large-diameter light diffusion agent, and a photopolymerization initiator (manufactured by BASF SE, IRGACURE 184) were weighed such that the mass ratio of binder component:small-diameter light diffusion agent:large-diameter light diffusion agent:photopolymerization initiator became 100:110:110:3 provided that the solid contents of the binder component were 100. These components were mixed together and stirred, thereby obtaining a mixture. That is, a ratio of mass of binder/mass of light diffusion agent is 0.45, and a ratio of mass of small-diameter particles/large-diameter particles is 1.

Methyl isobutyl ketone (MIBK) was added to the mixture such that the concentration of solid contents thereof became 50% by mass, thereby preparing a polymerizable composition for forming the light diffusion layer 20.

A predetermined position of a coating portion of a general RtoR film forming device, which had a coating portion using a die coater, a drying zone using heating, and a curing zone using ultraviolet irradiation, was filled with the polymerizable composition for forming the light diffusion layer 20. Furthermore, the roll of the support 12, on which the adhesion layer 18 was formed, was loaded on a predetermined position of the film forming device and inserted into a predetermined transport path. The support 12 was loaded such that a surface, which was opposite to the surface on which the inorganic layer 16 and the like were formed, of the support 12 was coated with the polymerizable composition.

In the film forming device, the support 12 was coated with the coating composition by using the die coater while being transported in a longitudinal direction, and passed through the drying zone with a temperature of 130° C. for 2 minutes. Thereafter, in the curing zone, the polymerizable composition was cured by being irradiated with ultraviolet rays (cumulative irradiation amount: about 500 mJ/cm$^2$), thereby forming the light diffusion layer 20. The support 12 was then wound up, thereby preparing the barrier film 10 shown in FIG. 1.

The coating amount of the polymerizable composition for forming the light diffusion layer 20 was set to be 27 mL/m$^2$. The thickness of the formed light diffusion layer 20 was 13.5 μm.

The refractive index n1 of the binder of the light diffusion layer 20 was determined by calculation. As a result, the refractive index n1 of the binder was 1.472. Because the refractive index n2 of the light diffusion agent is 1.42, the refractive index difference n1−n2 is 0.052.

The refractive index was calculated by (1.467 (first component)×60+1.48 (second component)×20+1.48 (third component)×20)/100.

Example 1-2

The barrier film 10 was prepared in the same manner as that in Example 1, except that the first component, the second component, and the third component were added as a binder component to the polymerizable composition for forming the light diffusion layer 20, a urethane acrylate oligomer (manufactured by Sartomer, CN9178NS, n=1.469) was added thereto, and these components were mixed together such that a mass ratio of first component:second component:third component:urethane acrylate oligomer became 60:15:15:10 in terms of solid contents.

The refractive index n1 of the binder was calculated in the same manner as that in Example 1. As a result, the refractive index n1 was 1.471. Therefore, the refractive index difference n1−n2 is 0.051.

In addition, Tg of the binder was measured in the same manner as that in Example 1-1. As a result, Tg was 59° C.

Example 1-3

The barrier film 10 was prepared in the same manner as that in Example 1, except that in the polymerizable composition for forming the light diffusion layer 20, the second component of the binder component was changed to ACRIT 8KX056 (n=1.48, Tg=111° C.) manufactured by TAISEI FINE CHEMICAL CO., LTD. from ACRIT 8KX012C manufactured by TAISEI FINE CHEMICAL CO., LTD.

The refractive index n1 of the binder was calculated in the same manner as that in Example 1. As a result, the refractive index n1 was 1.472. Therefore, the refractive index difference n1−n2 is 0.052.

In addition, Tg of the binder was measured in the same manner as that in Example 1-1. As a result, Tg was 67° C.

Example 1-4

The barrier film 10 was prepared in the same manner as that in Example 1, except that in the polymerizable composition for forming the light diffusion layer 20, the third component of the binder component was changed to ACRIT 8UA540H (n=1.48, Tg=23° C.) manufactured by TAISEI FINE CHEMICAL CO., LTD. from ACRIT 8UA347H manufactured by TAISEI FINE CHEMICAL CO., LTD.

The refractive index n1 of the binder was calculated in the same manner as that in Example 1. As a result, the refractive index n1 was 1.472. Therefore, the refractive index difference n1−n2 is 0.052.

In addition, Tg of the binder was measured in the same manner as that in Example 1-1. As a result, Tg was 61° C.

Example 1-5

The barrier film 10 was prepared in the same manner as that in Example 1, except that in the polymerizable composition for forming the light diffusion layer 20, the mass ratio of binder component:small-diameter light diffusion agent:

large-diameter light diffusion agent:photopolymerization initiator was changed to 100:150:150:3 from 100:110:110:3.

Accordingly, the ratio of mass of binder/mass of light diffusion agent is 0.3, and the ratio of mass of small-diameter particles/large-diameter particles is 1.

Example 1-6

The barrier film 10 was prepared in the same manner as that in Example 1, except that in the polymerizable composition for forming the light diffusion layer 20, the mass ratio of binder component:small-diameter light diffusion agent: large-diameter light diffusion agent:photopolymerization initiator was changed to 100:75:75:3 from 100:110:110:3.

Accordingly, the ratio of mass of binder/mass of light diffusion agent is 0.65, and the ratio of mass of small-diameter particles/large-diameter particles is 1.

Example 1-7-1

The barrier film 10 was prepared in the same manner as that in Example 1, except that in the polymerizable composition for forming the light diffusion layer 20, the first component, the second component, and the third component were added as a binder component, a curable acrylic resin (manufactured by Osaka Gas Chemicals Co., Ltd., OGSOL 200, n=1.6, Tg=200° C.) was added thereto, and these components were mixed together such that a mass ratio of first component:second component:third component:curable acrylic resin became 60:10:10:20 in terms of solid contents.

The refractive index n1 of the binder was calculated in the same manner as that in Example 1. As a result, the refractive index n1 was 1.5. Therefore, the refractive index difference n1−n2 is 0.08.

In addition, Tg of the binder was measured in the same manner as that in Example 1-1. As a result, Tg was 92° C.

Example 1-7-2

The barrier film 10 was prepared in the same manner as that in Example 1, except that in the polymerizable composition for forming the light diffusion layer 20, the first component, the second component, and the third component were added as a binder component, a curable acrylic resin (manufactured by Osaka Gas Chemicals Co., Ltd., OGSOL 200, n=1.6, Tg=200° C.) was added thereto, and these components were mixed together such that a mass ratio of first component:second component:third component:curable acrylic resin became 50:7.5:7.5:35 in terms of solid contents.

The refractive index n1 of the binder was calculated in the same manner as that in Example 1. As a result, the refractive index n1 was 1.52. Therefore, the refractive index difference n1−n2 is 0.1.

In addition, Tg of the binder was measured in the same manner as that in Example 1-1. As a result, Tg was 112° C.

Example 1-7-3

The barrier film 10 was prepared in the same manner as that in Example 1, except that in the polymerizable composition for forming the light diffusion layer 20, the first component, the second component, and the third component were added as a binder component, a curable acrylic resin (manufactured by SHIN-NAKAMURA CHEMICAL CO., LTD., APG 200, n=1.449, Tg=90° C.) was added thereto, and these components were mixed together such that a mass ratio of first component:second component:third component:curable acrylic resin became 50:7.5:7.5:35 in terms of solid contents.

The refractive index n1 of the binder was calculated in the same manner as that in Example 1. As a result, the refractive index n1 was 1.46. Therefore, the refractive index difference n1−n2 is 0.02.

In addition, Tg of the binder was measured in the same manner as that in Example 1-1. As a result, Tg was 74° C.

Example 1-8

The barrier film 10 was prepared in the same manner as that in Example 1, except that in the polymerizable composition for forming the light diffusion layer 20, the small-diameter light diffusion agent was changed to TOSPEARL 120 (average particle diameter: 2 μm, refractive index: 1.42) manufactured by Momentive Performance Materials Inc. from TOSPEARL 130 manufactured by Momentive Performance Materials Inc.

Example 1-9

The barrier film 10 was prepared in the same manner as that in Example 1, except that in the polymerizable composition for forming the light diffusion layer 20, the small-diameter light diffusion agent was changed to X52-854 (average particle diameter: 0.8 μm, refractive index: 1.42) manufactured by Shin-Etsu Silicone from TOSPEARL 130 manufactured by Momentive Performance Materials Inc.

Accordingly, the refractive index difference n1−n2 between the refractive index n1 (n=1.47) of the binder and the refractive index n2 of the small-diameter light diffusion agent is 0.05.

Example 1-10

The barrier film 10 was prepared in the same manner as that in Example 1, except that in the polymerizable composition for forming the light diffusion layer 20, the large-diameter light diffusion agent was changed to KMP 598 (average particle diameter: 13 μm, refractive index: 1.42) manufactured by Shin-Etsu Silicone from TOSPEARL 1100 manufactured by Momentive Performance Materials Inc.

Accordingly, the refractive index difference n1−n2 between the refractive index n1 (n=1.47) of the binder and the refractive index n2 of the large-diameter light diffusion agent is 0.05.

Example 1-11

The barrier film 10 was prepared in the same manner as that in Example 1, except that in the polymerizable composition for forming the light diffusion layer 20, the large-diameter light diffusion agent was changed to TOSPEARL 2000b (average particle diameter: 6 μm, refractive index: 1.42) manufactured by Momentive Performance Materials Inc. from TOSPEARL 1100 manufactured by Momentive Performance Materials Inc.

Example 1-12

The barrier film 10 was prepared in the same manner as that in Example 1, except that in the polymerizable composition for forming the light diffusion layer 20, the mass ratio of binder component:small-diameter light diffusion agent:

large-diameter light diffusion agent:photopolymerization initiator was changed to 100:80:140:3 from 100:110:110:3.

Accordingly, the ratio of mass of binder/mass of light diffusion agent is 0.45, and the ratio of mass of small-diameter particles/mass of large-diameter particles is 0.6.

Example 1-13

The barrier film 10 was prepared in the same manner as that in Example 1, except that in the polymerizable composition for forming the light diffusion layer 20, the mass ratio of binder component:small-diameter light diffusion agent:large-diameter light diffusion agent:photopolymerization initiator was changed to 100:130:90:3 from 100:110:110:3.

Accordingly, the ratio of mass of binder/mass of light diffusion agent is 0.45, and the ratio of mass of small-diameter particles/mass of large-diameter particles is 1.4.

Example 1-14

The gas barrier film 10 was prepared in the same manner as that in Example 1, except that in forming the light diffusion layer 20, the coating amount of the polymerizable composition forming the light diffusion layer 20 was set to be 40 mL/m$^2$.

The thickness of the formed light diffusion layer 20 was 20 μm.

Example 1-15

The gas barrier film 10 was prepared in the same manner as that in Example 1, except that in forming the light diffusion layer 20, the coating amount of the polymerizable composition forming the light diffusion layer 20 was set to be 10 mL/m$^2$.

The thickness of the formed light diffusion layer 20 was 5 μm.

Comparative Example 1-1

The barrier film 10 was prepared in the same manner as that in Example 1, except that in the polymerizable composition for forming the light diffusion layer 20, the second component was not used in the binder component, and the first component and the third component were mixed together such that a mass ratio of first component:third component became 60:40 in terms of solid contents.

The refractive index n1 of the binder was calculated in the same manner as that in Example 1. As a result, the refractive index n1 was 1.47. Accordingly, the refractive index difference n1−n2 is 0.05.

Furthermore, Tg of the binder was measured in the same manner as that in Example 1-1. As a result, Tg was 56° C.

Comparative Example 1-2

The barrier film 10 was prepared in the same manner as that in Example 1, except that in the polymerizable composition for forming the light diffusion layer 20, the third component was not used in the binder component, and the first component and the second component were mixed together such that a mass ratio of first component:second component became 60:40 in terms of solid contents.

The refractive index n1 of the binder was calculated in the same manner as that in Example 1. As a result, the refractive index n1 was 1.47. Accordingly, the refractive index difference n1−n2 is 0.05.

Furthermore, Tg of the binder was measured in the same manner as that in Example 1-1. As a result, Tg was 84° C.

Comparative Example 1-3

The barrier film 10 was prepared in the same manner as that in Example 1, except that in the polymerizable composition for forming the light diffusion layer 20, the first component was not used in the binder component, and the second component and the third component were mixed together such that a mass ratio of second component:third component became 50:50 in terms of solid contents.

The refractive index n1 of the binder was calculated in the same manner as that in Example 1. As a result, the refractive index n1 was 1.48. Accordingly, the refractive index difference n1−n2 is 0.06.

Furthermore, Tg of the binder was measured in the same manner as that in Example 1-1. As a result, Tg was 89.5° C.

[Evaluation of Optical Characteristics]

For each of the prepared gas barrier films, a total light transmittance and a haze were measured immediately after the gas barrier films were prepared, after the gas barrier films were subjected to testing for ultraviolet resistance and heat resistance, and after the gas barrier films were subjected to testing for moisture-heat resistance. The total light transmittance was measured from both the light diffusion layer side (TT1) and the opposite surface side (TT2).

The testing for ultraviolet resistance and heat resistance was performed by irradiating the films with ultraviolet rays in a cumulative irradiation amount of 5,000 mJ/cm$^2$ in a state where the films were being heated to 100° C. on a hot plate. The testing for moisture-heat resistance was performed by leaving the films to stand in an environment with a temperature of 60° C. and a relative humidity of 90% for 500 hours and in an environment with a temperature of 85° C. and a relative humidity of 85% for 500 hours.

Both the total light transmittance and the haze were measured using SH-7000 manufactured by NIPPON DENSHOKU INDUSTRIES Co., LTD. The total light transmittance was measured based on JIS K 7361, and the haze was measured based on JIS K 7136.

The value of the total light transmittance was evaluated based on the following standards. The results are shown in Table 2. In the table, the gas barrier film just prepared is represented by "Before durability test", the gas barrier film having undergone the testing for ultraviolet resistance and heat resistance is represented by "Ultraviolet and heat resistance", and the gas barrier film having undergone the testing for moisture-heat resistance is represented by "Moisture-heat resistance".

Total light transmittance measured from light diffusion layer side (TT1)

A: the total light transmittance was equal to or higher than 90%.

B: the total light transmittance was equal to or higher than 88% and less than 90%.

C: the total light transmittance was equal to or higher than 86% and less than 88%.

D: the total light transmittance was equal to or higher than 84% and less than 86%.

E: the total light transmittance was less than 84%.

Total light transmittance measured from surface side opposite to light diffusion layer side (TT2)

A: the total light transmittance was equal to or higher than 70%.

B: the total light transmittance was equal to or higher than 65% and less than 70%.

C: the total light transmittance was equal to or higher than 60% and less than 65%.

D: the total light transmittance was equal to or higher than 55% and less than 60%.

E: the total light transmittance was less than 55%.

[Measurement of Curling]

Each of the prepared gas barrier films was punched in a size of 10 cm×10 cm by using a Thomson blade, and by using samples obtained in this way, curling was measured. Each of the samples was placed on an installation surface. At four corners of the sample, a distance between the installation surface and the sample was measured, and the average of the distances at the four corners was calculated. The distance was measured in a state where the light diffusion layer side faced up.

[Evaluation of Adhesiveness]

The adhesiveness was evaluated by the cross-cut peeling test based on JIS K5400.

Specifically, on the surface, on which the light diffusion layer was formed, of each of the gas barrier films, by using a cutter knife, cuts meeting the film surface at 90° were made at an interval of 1 mm, thereby creating 100 grids at an interval of 1 mm. A tape was bonded thereto by using a Mylar tape (manufactured by NITTO DENKO CORPORATION, polyester tape, NO. 31B) having a width of 2 cm and then peeled off. By the number of residual meshes of the light diffusion layer formed on the support, the adhesiveness was evaluated.

The evaluation standards are as below.

A: the number of residual meshes was equal to or greater than 90.

B: the number of residual meshes was 80 to 89.

C: the number of residual meshes was 70 to 79.

D: the number of residual meshes was equal to or smaller than 70.

Table 1 shows the details of each of the gas barrier films, and Table 2 shows the evaluation results.

TABLE 1

| | | Light diffusion layer | | | | | | |
|---|---|---|---|---|---|---|---|---|
| | Binder | | | Light diffusion agent | | | Mass ratio of binder/ diffusion agent | Refractive index difference n1 − n2 | Thickness [μm] |
| | Change of component | Refractive index n1 | Tg [° C.] | Particle diameter [μm] | | Mass ratio (small/large) | | | |
| | | | | Small diameter | Large diameter | | | | |
| Example 1-1 | — | 1.472 | 70 | 3 | 11 | 1 | 0.45 | 0.052 | 13.5 |
| Example 1-2 | Adding CN9178NS | 1.471 | 59 | 3 | 11 | 1 | 0.45 | 0.051 | 13.5 |
| Example 1-3 | Changing second component | 1.472 | 67 | 3 | 11 | 1 | 0.45 | 0.052 | 13.5 |
| Example 1-4 | Changing third component | 1.472 | 61 | 3 | 11 | 1 | 0.45 | 0.052 | 13.5 |
| Example 1-5 | — | 1.472 | 70 | 3 | 11 | 1 | 0.3 | 0.052 | 13.5 |
| Example 1-6 | — | 1.472 | 70 | 3 | 11 | 1 | 0.65 | 0.052 | 13.5 |
| Example 1-7-1 | Adding OGSOL | 1.5 | 92 | 3 | 11 | 1 | 0.45 | 0.08 | 13.5 |
| Example 1-7-2 | Adding OGSOL | 1.52 | 112 | 3 | 11 | 1 | 0.45 | 0.1 | 13.5 |
| Example 1-7-3 | Adding APG-200 | 1.46 | 74 | 3 | 11 | 1 | 0.45 | 0.04 | 13.5 |
| Example 1-8 | — | 1.472 | 70 | 2 | 11 | 1 | 0.45 | 0.052 | 13.5 |
| Example 1-9 | — | 1.472 | 70 | 0.8 | 11 | 1 | 0.45 | 0.052 | 13.5 |
| Example 1-10 | — | 1.472 | 70 | 3 | 13 | 1 | 0.45 | 0.052 | 13.5 |
| Example 1-11 | — | 1.472 | 70 | 3 | 6 | 1 | 0.45 | 0.052 | 13.5 |
| Example 1-12 | — | 1.472 | 70 | 3 | 11 | 0.6 | 0.45 | 0.052 | 13.5 |
| Example 1-13 | — | 1.472 | 70 | 3 | 11 | 1.4 | 0.45 | 0.052 | 13.5 |
| Example 1-14 | — | 1.472 | 70 | 3 | 11 | 1 | 0.45 | 0.052 | 20 |
| Example 1-15 | — | 1.472 | 70 | 3 | 11 | 1 | 0.45 | 0.052 | 5 |
| Comparative Example 1-1 | Free of second component | 1.472 | 56.4 | 3 | 11 | 1 | 0.45 | 0.052 | 13.5 |
| Comparative Example 1-2 | Free of third component | 1.472 | 84.8 | 3 | 11 | 1 | 0.45 | 0.052 | 13.5 |
| Comparative Example 1-3 | Free of first component | 1.472 | 89.5 | 3 | 11 | 1 | 0.45 | 0.052 | 13.5 |

In the refractive index difference, n2 is a refractive index of the light diffusion agent.

TABLE 2

| | Evaluation | | | | | | | | |
|---|---|---|---|---|---|---|---|---|---|
| | Total light transmittance | | | | | | | | Evaluation Haze [%] |
| | Measured from diffusion layer side (TT1) | | | | Measured from opposite surface side (TT2) | | | | |
| | Before durability test | Ultraviolet and heat resistance | Moisture-heat resistance [° C./%] | | Before Before test | Ultraviolet and heat resistance | Moisture-heat resistance [° C./%] | | Before durability test |
| | | | 60/90 | 85/85 | | | 60/90 | 85/85 | |
| Example 1-1 | A | A | A | A | A | A | A | A | 97 |
| Example 1-2 | A | B | B | B | A | A | A | A | 96 |
| Example 1-3 | A | A | A | A | A | A | A | A | 97 |

TABLE 2-continued

| | | | | | | | | | |
|---|---|---|---|---|---|---|---|---|---|
| Example 1-4 | A | B | B | B | A | A | A | A | 97 |
| Example 1-5 | A | A | A | A | B | B | B | B | 85 |
| Example 1-6 | C | C | C | C | C | C | C | C | 99 |
| Example 1-7-1 | C | C | C | C | A | A | A | A | 98 |
| Example 1-7-2 | C | C | C | C | A | A | A | A | 99 |
| Example 1-7-3 | A | B | B | B | A | A | A | B | 89 |
| Example 1-8 | A | A | A | A | A | A | A | A | 86 |
| Example 1-9 | A | A | A | A | A | A | A | A | 84 |
| Example 1-10 | B | B | B | B | B | C | C | C | 98 |
| Example 1-11 | A | A | A | A | A | A | A | A | 96 |
| Example 1-12 | A | A | A | A | C | C | C | C | 99 |
| Example 1-13 | A | A | A | A | A | A | A | A | 89 |
| Example 1-14 | B | B | B | B | A | A | B | B | 99 |
| Example 1-15 | A | A | A | A | A | A | A | A | 89 |
| Comparative Example 1-1 | A | E | E | E | A | E | D | E | 97 |
| Comparative Example 1-2 | A | B | E | E | A | E | D | E | 97 |
| Comparative Example 1-3 | B | C | E | E | A | E | D | E | 97 |

| | Evaluation | | | | | | |
|---|---|---|---|---|---|---|---|
| | Haze [%] | | Adhesiveness | | | | |
| | Ultraviolet and heat resistance | Moisture-heat resistance [° C./%] | | Before durability test | Ultraviolet and heat resistance | Moisture-heat resistance [° C./%] | | Curling [mm] |
| | | 60/90 | 85/85 | | | 60/90 | 85/85 | |
| Example 1-1 | 97.5 | 97.5 | 97.5 | A | A | A | A | 1 |
| Example 1-2 | 93 | 93 | 93 | A | A | A | A | 0 |
| Example 1-3 | 97.5 | 97.5 | 97.5 | A | A | A | A | 1 |
| Example 1-4 | 98 | 98 | 98.5 | A | A | A | A | 1 |
| Example 1-5 | 85 | 85 | 85 | A | A | A | A | 2 |
| Example 1-6 | 99 | 99 | 99.5 | A | A | A | A | 1 |
| Example 1-7-1 | 98 | 98 | 98 | B | B | B | B | 3 |
| Example 1-7-2 | 99 | 99 | 99 | B | B | B | B | 4 |
| Example 1-7-3 | 95 | 95 | 97 | B | B | B | B | 3 |
| Example 1-8 | 86 | 86.5 | 86.5 | A | A | A | A | 2 |
| Example 1-9 | 83 | 84 | 84 | A | A | A | A | 3 |
| Example 1-10 | 98.5 | 99 | 99 | A | A | A | A | 1 |
| Example 1-11 | 96 | 96.5 | 96.5 | A | A | A | A | 1 |
| Example 1-12 | 99 | 99 | 99 | A | A | A | A | 0.5 |
| Example 1-13 | 90 | 90.5 | 90.5 | A | A | A | A | 3 |
| Example 1-14 | 99 | 99.5 | 99.5 | A | A | A | A | 4 |
| Example 1-15 | 89.5 | 90 | 90 | A | A | A | A | 0.5 |
| Comparative Example 1-1 | 99.5 | 99 | 99 | B | C | C | C | 1 |
| Comparative Example 1-2 | 99.5 | 99 | 99 | C | D | D | D | 1 |
| Comparative Example 1-3 | 99.5 | 99.5 | 99.5 | C | D | D | D | 8 |

As shown in Table 2, the gas barrier film of the present invention has a high total light transmittance, a high haze, and excellent light diffusion performance. Furthermore, in the gas barrier film of the present invention, the light diffusion layer exhibits high adhesiveness, and the gas barrier film hardly curls. In addition, the gas barrier film of the present invention maintains these excellent performances even after the gas barrier film is subjected to the testing for ultraviolet and heat resistance and the testing for moisture-heat resistance. That is, the gas barrier film of the present invention is a gas barrier film exhibits high durability against light or heat.

In contrast, although Comparative Examples 1-1 to 1-3, in which the binder of the light diffusion layer does not have any of the first component, the second component, and the third component, exhibit excellent optical characteristics at first, after the testing for ultraviolet and heat resistance and the testing for moisture-heat resistance are performed, total light transmittance of Comparative Examples 1-1 to 1-3 is significantly reduced. Furthermore, in Comparative Example 1-2, in which the light diffusion layer does not have the third component, and in Comparative Example 1-3, in which the light diffusion layer does not have the first component, the adhesiveness of the light diffusion layer is slightly low from the first.

Examples 2-1 to 2-15 and Comparative Examples 2-1 to 2-3

The following quantum dot-containing polymerizable composition was prepared. The quantum dot-containing polymerizable composition was used as a coating solution by being filtered through a polypropylene filter having a pore size of 0.2 μm and then dried under reduced pressure for 30 minutes. The concentration of quantum dots in the following toluene dispersion liquid was 1% by mass.

<Quantum Dot-Containing Polymerizable Composition>
Toluene dispersion liquid of quantum dot 1 (emission maximum: 520 nm): 10 parts by mass
Toluene dispersion liquid of quantum dot 2 (emission maximum: 630 nm): 1 part by mass Lauryl methacrylate: 80.8 parts by mass
Trimethylolpropane triacrylate: 18.2 parts by mass
Photopolymerization initiator (manufactured by BASF SE, IRGACURE 819): 0.003 parts by mass In the toluene dispersion liquid of the quantum dot 1, CZ520-100 manufactured by NN-LABS, LLC was used. In the toluene dispersion liquid of the quantum dot 2, CZ620-100 manufactured by NN-LABS, LLC was used. All of these are quantum dots using CdSe as a core, ZnS as a shell, and octadecylamine as a ligand.

The barrier film 34 shown in FIG. 2 was prepared in the same manner as that used for preparing the gas barrier film 10, except that the light diffusion layer 20 was not formed.

By using the gas barrier film 10 prepared in Examples 1-1 to 1-15 and Comparative Examples 1-1 to 1-3 and using the barrier film 34 prepared as above, wavelength conversion films were prepared as below.

A predetermined position of a coating portion of a general RtoR film forming device, which had a coating device using a die coater, a laminator, and a curing zone using ultraviolet irradiation, was filled with the quantum dot-containing polymerizable composition.

Furthermore, a roll obtained by winding the barrier film 10, in which the light diffusion layer 20 was formed, was loaded on a predetermined position of the film forming device, and the gas barrier film was inserted into a predetermined transport path passing through the coating portion, the laminator, and the curing portion. In addition, a roll obtained by winding the barrier film 34, in which the light diffusion layer 20 was not formed, was loaded on a predetermined position of the film forming device, and the gas barrier film was inserted into a predetermined transport path passing through the laminator and the curing portion. The gas barrier film passing through the coating portion was loaded on the film forming device such that the adhesion layer 18 becomes a surface to be coated with the coating composition. Both the gas barrier films were loaded on the film forming device such that the adhesion layers 18 of the gas barrier films faced each other.

Two sheets of gas barrier films were transported at a transport speed of 1 m/min under a tension of 60 N/m, and in this state, the barrier film 10 passing through the coating device was coated with the quantum dot-containing polymerizable composition, thereby forming a coating film having a thickness of 50 μm.

Then, the barrier film 10 on which the coating film was formed was transported while being supported by a backup roller, and another barrier film 34 was laminated thereon by the laminator. The temperature of the backup roller was controlled at 30° C.

Furthermore, in a state where the laminate in which the coating film was sandwiched between two sheets of gas barrier films was being transported, ultraviolet irradiation was performed in the curing zone such that the quantum dot-containing polymerizable composition was cured, thereby forming the quantum dot layer 32. Then, the laminate was wound up. In this way, the wavelength conversion film 30 shown in FIG. 2 was prepared in which the quantum dot layer 32 was sandwiched between two sheets of gas barrier films.

The film thickness of the formed quantum dot layer 32 was 50 μm. In addition, in the curing zone, a 160 W air-cooled metal halide lamp (manufactured by EYE GRAPHICS Co., Ltd.) was used, and the cumulative irradiation amount of the ultraviolet rays was 2,000 mJ/cm².

[Measurement of Luminance]

A commercial tablet terminal (manufactured by Amazon.com, Inc., Kindle Fire HDX 7") having a blue light source in a backlight unit was disassembled, and the backlight unit was taken out. The wavelength conversion film cut in a predetermined size was placed on light guide plate of the backlight unit taken out, and two prism sheets taken out of the tablet terminal were stacked on the laminated film such that the directions of the patterns of surface asperities became orthogonal to each other.

The backlight unit was turned on, and the luminance of the central portion was measured using a luminance meter (SR3, manufactured by TOPCON CORPORATION) installed in a position 740 mm distant from the surface of the backlight unit in a direction perpendicular to the surface.

Provided that the measured luminance is equal to or higher than 15,300 cd/m², it can be concluded that LCD incorporated into the backlight unit can display images with high luminance.

The evaluation standards are as below.

A: the measured luminance was equal to or higher than 15,300 cd/m².

B: the measured luminance was equal to or higher than 14,800 cd/m² and less than 15,300 cd/m².

C: the measured luminance was equal to or higher than 14,300 cd/m² and less than 14,800 cd/m².

D: the measured luminance was equal to or higher than 13,800 cd/m² and less than 14,300 cd/m².

E: the measured luminance was less than 13,800 cd/m².

[Evaluation of Durability]

Each of the backlight units whose luminance had been measured was put into a thermohygrostat tank with a temperature of 60° C. and a relative humidity of 90% and a thermohygrostat tank with a temperature of 85° C. and a relative humidity of 85%, and stayed turned on. The backlight unit was left as it was for 500 hours, and then the change of luminance was measured.

Durability was evaluated in the same manner as that used for measuring luminance.

The results are shown in Table 3.

TABLE 3

| | | | Evaluation of durability | |
|---|---|---|---|---|
| | Used barrier film | Measurement of luminance [cd/m²] | 60° C. 90% | 85° C. 85% |
| Example 2-1 | Example 1-1 | A | A | A |
| Example 2-2 | Example 1-2 | A | B | B |
| Example 2-3 | Example 1-3 | A | A | A |
| Example 2-4 | Example 1-4 | A | B | B |
| Example 2-5 | Example 1-5 | A | A | A |
| Example 2-6 | Example 1-6 | C | C | C |
| Example 2-7-1 | Example 1-7-1 | C | C | C |
| Example 2-7-2 | Example 1-7-2 | C | C | C |
| Example 2-7-3 | Example 1-7-3 | A | B | B |
| Example 2-8 | Example 1-8 | A | A | A |
| Example 2-9 | Example 1-9 | A | A | A |
| Example 2-10 | Example 1-10 | B | B | B |
| Example 2-11 | Example 1-11 | A | A | A |
| Example 2-12 | Example 1-12 | A | A | A |
| Example 2-13 | Example 1-13 | A | A | A |
| Example 2-14 | Example 1-14 | B | B | B |
| Example 2-15 | Example 1-15 | A | A | A |
| Comparative Example 2-1 | Comparative Example 2-1 | A | E | E |
| Comparative Example 2-2 | Comparative Example 2-2 | A | E | E |
| Comparative Example 2-3 | Comparative Example 2-3 | B | E | E |

As shown in Table 3, the wavelength conversion films of examples, in which the gas barrier film (with a light diffusion layer) of the present invention was used, substantially do not undergo luminance reduction before and after the testing for ultraviolet and heat resistance and the testing for moisture-heat resistance.

In contrast, although the wavelength conversion films of Comparative Examples 2-1 to 2-3, in which the gas barrier film (with a light diffusion layer) having a light diffusion layer containing a binder that does not have any of the first component, the second component, and the third component was used, has high luminance at first, after the testing for ultraviolet and heat resistance and the testing for moisture-heat resistance, the luminance of the wavelength conversion films is significantly reduced.

The above results clearly show the effects of the present invention.

The present invention can be suitably used for manufacturing a functional laminated film such as a wavelength conversion film or manufacturing a liquid crystal display.

EXPLANATION OF REFERENCES

10: (gas) barrier film (with a light diffusion layer)
12: support
14: organic layer as an underlying base
16: inorganic layer
18: adhesion layer
20: light diffusion layer
30: wavelength conversion film
32: quantum dot layer
34: gas barrier film

What is claimed is:

1. A gas barrier film with a light diffusion layer comprising:
   a support;
   a combination of an inorganic layer and an organic layer which is an underlying base of the inorganic layer on a first surface of the support; and
   a light diffusion layer that is on a second surface of the support opposite to the first surface side and contains a binder in which a light diffusion agent is dispersed,
   wherein the binder contains
      a first component which is a graft copolymer having an acryl polymer as a main chain and at least one of an acryloyl group-terminated urethane polymer or an acryloyl group-terminated urethane oligomer as a side chain,
      a second component having an acryl polymer as a main chain and methacrylate as a side chain, and
      a third component which is a graft copolymer having an acryl polymer as a main chain and at least one of a polycarbonate group-terminated urethane polymer or a polycarbonate group-terminated urethane oligomer as a side chain, and
   the light diffusion agent is silicone resin particles.

2. The gas barrier film with a light diffusion layer according to claim 1,
   wherein the first component has a weight-average molecular weight of 10,000 to 300,000 and a double bond equivalent equal to or greater than 1,000 g/mol.

3. The gas barrier film with a light diffusion layer according to claim 1,
   wherein the second component has a weight-average molecular weight of 20,000 to 40,000.

4. The gas barrier film with a light diffusion layer according to claim 1,
   wherein the binder contains at least one of a urethane acrylate polymer or a urethane acrylate oligomer.

5. The gas barrier film with a light diffusion layer according to claim 1,
   wherein the second component has a glass transition temperature equal to or higher than 100° C.

6. The gas barrier film with a light diffusion layer according to claim 1,
   wherein the third component has a glass transition temperature equal to or higher than 50° C.

7. The gas barrier film with a light diffusion layer according to claim 1,
   wherein a difference n1−n2 between a refractive index n1 of the binder and a refractive index n2 of the light diffusion agent is 0.04 to 0.1, and
   the refractive index n1 of the binder is equal to or lower than 1.52.

8. The gas barrier film with a light diffusion layer according to claim 4,
   wherein a difference n1−n2 between a refractive index n1 of the binder and a refractive index n2 of the light diffusion agent is 0.04 to 0.1, and
   the refractive index n1 of the binder is equal to or lower than 1.52.

9. The gas barrier film with a light diffusion layer according to claim 1,
   wherein a mass of the binder with respect to a mass of the light diffusion agent is 0.3 to 0.65.

10. The gas barrier film with a light diffusion layer according to claim 1,
    wherein the light diffusion agent is two kinds of silicone resin particles having different particle diameters,
    first silicone resin particles have a particle diameter of 1 to 5 μm,
    second silicone resin particles have a particle diameter of 6 to 14 μm, and
    a total mass of the first silicone resin particles with respect to a total mass of the second silicone resin particles is 0.6 to 1.4.

11. The gas barrier film with a light diffusion layer according to claim 4,
    wherein the light diffusion agent is two kinds of silicone resin particles having different particle diameters,
    first silicone resin particles have a particle diameter of 1 to 5 μm,
    second silicone resin particles have a particle diameter of 6 to 14 μm, and
    a total mass of the first silicone resin particles with respect to a total mass of the second silicone resin particles is 0.6 to 1.4.

12. The gas barrier film with a light diffusion layer according to claim 7,
    wherein the light diffusion agent is two kinds of silicone resin particles having different particle diameters,
    first silicone resin particles have a particle diameter of 1 to 5 μm,
    second silicone resin particles have a particle diameter of 6 to 14 μm, and
    a total mass of the first silicone resin particles with respect to a total mass of the second silicone resin particles is 0.6 to 1.4.

13. The gas barrier film with a light diffusion layer according to claim 8,
    wherein the light diffusion agent is two kinds of silicone resin particles having different particle diameters,
    first silicone resin particles have a particle diameter of 1 to 5 μm, second silicone resin particles have a particle diameter of 6 to 14 µm, and a total mass of the first silicone resin particles with respect to a total mass of the second silicone resin particles is 0.6 to 1.4.

14. The gas barrier film with a light diffusion layer according to claim 1, wherein the light diffusion layer has a thickness of 10 to 20 µm.

15. The gas barrier film with a light diffusion layer according to claim 1, wherein a difference TT1−TT2 between a transmittance TT1 from the light diffusion layer side and a transmittance TT2 from a side opposite to the light diffusion layer side is 10% to 30%, and the transmittance TT1 from the light diffusion layer side is equal to or higher than 88%.

16. The gas barrier film with a light diffusion layer according to claim 1, wherein a haze is equal to or higher than 90%.

17. A wavelength conversion film comprising:

a wavelength conversion layer; and the gas barrier film with a light diffusion layer according to claim 1 that is laminated on at least one surface of the wavelength conversion layer, wherein the wavelength conversion layer is provided on the first surface side of the support.

18. The wavelength conversion film according to claim 17, wherein the wavelength conversion layer is a quantum dot layer.

19. The wavelength conversion film according to claim 17, wherein the gas barrier film with a light diffusion layer is provided on one surface of the wavelength conversion layer, and a gas barrier film is provided on the other surface of the wavelength conversion layer.

20. The wavelength conversion film according to claim 19, wherein the gas barrier film has a support and a combination of an inorganic layer and an organic layer which is an underlying base of the inorganic layer on one surface of the support, and the surface, on which the organic layer and the inorganic layer are formed, faces the wavelength conversion layer side.

* * * * *